(12) United States Patent
Thompson et al.

(10) Patent No.: US 11,975,725 B2
(45) Date of Patent: May 7, 2024

(54) SYSTEMS AND METHODS FOR UPDATING THE PARAMETERS OF A MODEL PREDICTIVE CONTROLLER WITH LEARNED EXTERNAL PARAMETERS GENERATED USING SIMULATIONS AND MACHINE LEARNING

(71) Applicant: TOYOTA RESEARCH INSTITUTE, INC., Los Altos, CA (US)

(72) Inventors: Michael Thompson, Los Altos, CA (US); Carrie Bobier-Tiu, Los Altos, CA (US); Manuel Ahumada, San Jose, CA (US); Arjun Bhargava, San Francisco, CA (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 448 days.

(21) Appl. No.: 17/165,801

(22) Filed: Feb. 2, 2021

(65) Prior Publication Data
US 2022/0242422 A1 Aug. 4, 2022

(51) Int. Cl.
*B60W 50/00* (2006.01)
*B60W 30/02* (2012.01)
(Continued)

(52) U.S. Cl.
CPC ........ *B60W 50/0097* (2013.01); *B60W 30/02* (2013.01); *B60W 30/09* (2013.01);
(Continued)

(58) Field of Classification Search
CPC . B60W 2040/1315; B60W 2050/0088; B60W 2555/20; B60W 30/02;
(Continued)

(56) References Cited

U.S. PATENT DOCUMENTS 6,434,454 B1 8/2002 Suzuki
7,451,004 B2 11/2008 Thiele
(Continued)

FOREIGN PATENT DOCUMENTS

JP 2011021518 A 2/2011

OTHER PUBLICATIONS

Lima, Pedro F., et al. "Spatial Model Predictive Control for Smooth and Accurate Steering of an Autonomous Truck", vol. 2, No. 4, IEEE, 2017, pp. 238-250, doi: 10.1109/TIV.2017.2767279.
(Continued)

*Primary Examiner* — Jaime Figueroa
*Assistant Examiner* — Zachary Joseph Wallace
(74) *Attorney, Agent, or Firm* — SHEPPARD, MULLIN, RICHTER & HAMPTON LLP; Hector A. Agdeppa; Daniel N. Yannuzzi

(57) ABSTRACT

A computer implemented method for determining optimal values for operational parameters for a model predictive controller for controlling a vehicle, can receive from a data store or a graphical user interface, ranges for one or more external parameters. The computer implemented method can determine optimum values for external parameters of the vehicle by simulating a vehicle operation across the ranges of the one or more operational parameters by solving a vehicle control problem and determining an output of the vehicle control problem based on a result for the simulated vehicle operation. A vehicle can include a processing component configured to adjust a control input for an actuator of the vehicle according to a control algorithm and based on the optimum values of the vehicle parameter as determined by the computer implemented method.

21 Claims, 6 Drawing Sheets

(51) Int. Cl.
*B60W 30/09* (2012.01)
*B60W 30/10* (2006.01)
*B60W 40/068* (2012.01)
*B60W 40/13* (2012.01)
*B60W 50/14* (2020.01)
*B60W 60/00* (2020.01)
*G08G 1/16* (2006.01)

(52) U.S. Cl.
CPC .......... *B60W 30/10* (2013.01); *B60W 40/068* (2013.01); *B60W 40/13* (2013.01); *B60W 50/14* (2013.01); *B60W 60/0015* (2020.02); *G08G 1/16* (2013.01); *B60W 2040/1315* (2013.01); *B60W 2555/20* (2020.02)

(58) Field of Classification Search
CPC ...... B60W 30/09; B60W 30/10; B60W 30/12; B60W 40/068; B60W 40/13; B60W 50/0097; B60W 50/14; B60W 60/0015; G08G 1/16; G08G 1/166
See application file for complete search history.

(56) References Cited

U.S. PATENT DOCUMENTS

| | | | |
|---|---|---|---|
| 7,702,446 B2 | 4/2010 | Hiwatashi | |
| 7,856,281 B2 | 12/2010 | Thiele | |
| 7,953,521 B2 | 5/2011 | Tipping | |
| 10,732,595 B2 | 8/2020 | Tokuda | |
| 10,752,269 B2 | 8/2020 | Govindappa | |
| 11,577,732 B2* | 2/2023 | Foil | B60W 60/0016 |
| 11,702,105 B2* | 7/2023 | Alvarez | B60W 30/0953 |
| | | | 701/26 |
| 11,840,258 B2* | 12/2023 | Shalev-Shwartz | B60W 40/107 |
| 2016/0357169 A1 | 12/2016 | Di Cairano | |
| 2019/0113920 A1 | 4/2019 | England | |
| 2020/0216085 A1 | 7/2020 | Bobier-Tiu | |
| 2020/0310420 A1* | 10/2020 | Scorcioni | G08G 1/166 |
| 2021/0116256 A1* | 4/2021 | Konrardy | B60W 60/001 |
| 2022/0041158 A1* | 2/2022 | Notohardjono | G06F 30/27 |
| 2022/0126864 A1* | 4/2022 | Moustafa | G08G 1/096775 |
| 2022/0153283 A1* | 5/2022 | Ostrowski | B60W 50/0098 |
| 2023/0331247 A1* | 10/2023 | Wurmsdobler | B60W 60/001 |

OTHER PUBLICATIONS

Quirós, Roberto S-R, "EKF-based parameter estimation for MPC applied to lateral vehicle dynamics", KTH Royal Institute of Technology School of Electrical Engineering, Stockholm, TRITA EE 2017:153; ISSN 1653-5146, Sweden 2017.

Heckman CR, Keivan N, Sibley G. Simulation-in-the-loop for Planning and Model-Predictive Control. Robotics Science and Systems Workshop on Realistic, Rapid and Repeatable Robot Simulation; Jul. 12-17, 2015; Rome, Italy.

* cited by examiner

SYSTEMS AND METHODS FOR UPDATING THE PARAMETERS OF A MODEL PREDICTIVE CONTROLLER WITH LEARNED EXTERNAL PARAMETERS GENERATED USING SIMULATIONS AND MACHINE LEARNING

TECHNICAL FIELD

The present disclosure relates generally to model predictive controllers, and more particularly, some embodiments relate to optimizing parameters for a model predictive controller for vehicle navigation using simulations and machine learning.

CROSS REFERENCE TO RELATED APPLICATIONS

The present application is related to co-pending and co-owned U.S. patent application Ser. No. 17/165,770, filed Feb. 2, 2021, titled "SYSTEMS AND METHODS FOR UPDATING THE PARAMETERS OF A MODEL PREDICTIVE CONTROLLER WITH LEARNED OPERATIONAL AND VEHICLE PARAMETERS GENERATED USING SIMULATIONS AND MACHINE LEARNING", and U.S. patent application Ser. No. 17/165,822, filed Feb. 2, 2021, titled "SYSTEMS AND METHODS FOR UPDATING THE PARAMETERS OF A MODEL PREDICTIVE CONTROLLER WITH LEARNED CONTROLS PARAMETERS GENERATED USING SIMULATIONS AND MACHINE LEARNING", which are incorporated herein by reference in their entirety.

BRIEF SUMMARY OF THE DISCLOSURE

An important function of autonomous vehicles and other robotic devices is path tracking or corridor keeping. Path tracking control endeavors to control the vehicle to follow a predefined or desired path, within envelopes of the vehicle system considering current conditions. Model predictive controllers (MPCs) are among the most widely used algorithms for path tracking autonomous vehicles.

Current model predictive controllers (MPC) for robotics, including autonomous vehicles and other systems, utilize preset operational parameters, such as vehicle, external, and controls parameters. These may include vehicle parameters such as speed, tire tread and type, suspension settings, etc.; external conditions such as road conditions, weather, traffic, etc.; and controls parameters such as prediction horizon, control horizon, and sampling time. Current systems utilize fixed parameters.

Embodiments of the systems and methods disclosed herein may be implemented to improve upon current technology by utilizing learned operational parameters (which include but are not limited to at least one of vehicle, external, and controls parameters), as opposed to fixed parameters that do not change. By utilizing learned vehicle parameters to consider changes to the vehicle (such as more or fewer passengers, wear and tear on the tires, new tires, etc.) the model predictive controller (MPC) can operate more effectively. The model predictive controller can further operate more effectively by utilizing learned external parameters to consider changes external to the vehicle (such as changes in friction between the vehicle and the road, which could be caused by adverse or favorable weather). The MPC can operate more effectively, for example by dynamically updating one or more controls parameters (such as weights of the MPC).

In accordance with some embodiments of the disclosed technology is a computer implemented method for determining optimal operational parameters for a model predictive controller for controlling a vehicle. The method can include receiving, at a hardware processor a range for one or more operational parameter. The range for one or more operational parameter can include a range for one or more external parameters. The range can be received from a data store or a graphical user interface. The method can include determining by a machine learning vehicle performance circuit, an optimum value for an external parameter (i.e. of the one or more external parameters) The machine learning vehicle performance circuit can be a trained machine learning vehicle performance circuit.

The trained machine learning vehicle performance circuit can be trained by simulating, by a vehicle control circuit, a vehicle operation across a range of the one or more operational parameters by solving a vehicle control problem. The training can further include determining, by the machine learning vehicle performance circuit, an output of the vehicle control problem. The output can be based on a result for the simulated vehicle operation. The trained machine learning vehicle performance circuit can be updated based on the output.

The at least one external parameter can be selected from a group consisting of: a friction coefficient between at least one tire and the road, a gravitational constant, a road surface roughness, an external humidity, a wind vector, and an external temperature.

The one or more operational parameters further comprise at least one or more vehicle parameter. The one or more vehicle parameter can be selected from a group consisting of a distance a from the center of gravity (CG) to a front axle of the vehicle, a distance b from the center of gravity (CG) to a rear axle of the vehicle, a distance L from the center of the front axle to the center of the rear axle of the vehicle, a tire distance from the CG to the rear axle of the vehicle, a vehicle speed $V_x$, a vehicle yaw rate r, vehicle sideslip angle $\beta$, front steering angle $\delta$, front and rear lateral tire forces and $F_{yf}$ and $F_{yr}$, a vehicle mass m, a yaw inertia $I_{zz}$, a height h of the vehicle's CG, a wheel radius R, a cornering stiffness C, a front axle cornering stiffness $C_{af}$, or a rear axle cornering stiffness $C_{ar}$.

The determined optimum values of the one or more operational parameters can be for parameters which are not directly measurable by a vehicle outside of simulation. The vehicle operation can be simulated across a range of one or more parameters which are parameters which are directly measurable by a vehicle.

The vehicle operation can include at least one of a path tracking, corridor (e.g. lane) keeping, stabilization, or collision avoidance maneuver. Optimum values for the one or more operational parameters can correspond to the values of the parameters which were determined by the trained machine learning vehicle performance circuit to allow for the vehicle to at least one of: (i) track the path in the path tracking maneuver, (ii) remain within the corridor in the corridor keeping maneuver, (iii) stabilize the vehicle in the stabilization maneuver, or (iv) maneuver to avoid vehicle collision in the collision avoidance maneuver.

The method can further include generating a training set of optimum one or more operational parameters. The training set of optimum one or more operational parameters can be configured to be used as an initial parameter set for a model predictive controller operating on a vehicle. The training set can include optimum values for the one or more external parameters.

The vehicle operation can include at least one of a path tracking, corridor keeping, stabilization, or collision avoidance maneuver. The trained machine learning vehicle performance circuit can be trained by simulating, by the vehicle control circuit, the vehicle operation across a full range of the one or more operational parameters. Simulating the vehicle operation can include solving a model predictive control problem for at least one of the path tracking, corridor keeping, stabilization, or collision avoidance maneuver. The model predictive control problem can be solved to determine the optimum value for the first parameter based on outcome of the path tracking, corridor keeping, stabilization, or collision avoidance maneuver during simulation.

The one or more operational parameters can include a first external parameter and one or more other parameters. Determining by the trained machine learning vehicle performance circuit, optimum values for the one or more operational parameters can include determining by the trained machine learning vehicle performance circuit, a value for the first external parameter based on the one or more other parameters.

The one or more operational parameters further comprise at least one controls parameter. The vehicle control problem can include the model predictive controller, and wherein the at least one controls parameters comprise one or more of a gain Q on a vehicle state, a gain R on an input to the model predictive controller, or a gain W on a slack to the vehicle state.

The operational parameters can further include a vehicle parameter, and the gain Q on the vehicle state, the gain R on the input, or the gain W on the slack can be gains based on the one or more vehicle parameters.

The vehicle operation can include at least one of a path tracking, corridor keeping, stabilization, or collision avoidance maneuver. Optimum values for the one or more operational parameters can correspond to the values of the controls parameters which were determined by the trained machine learning vehicle performance circuit to allow for the vehicle to at least one of: (i) track the path in the path tracking maneuver, (ii) remain within the corridor in the corridor keeping maneuver, (iii) stabilize the vehicle in a stabilization maneuver, or (iv) maneuver the vehicle to avoid vehicle collision in the collision avoidance maneuver.

The vehicle control problem can include a model predictive control problem which controls the control input. The control input can be controlled based on a current vehicle state, predicted boundaries for values of the one or more operational parameters, and a future vehicle state. The future vehicle state can be determined based on the predicted boundaries for values of the one or more operational parameters.

In accordance with several embodiments, the disclosed technology includes a vehicle. The vehicle can include a processing component. The processing component can be configured to adjust a control input for an actuator of the vehicle according to a control algorithm. The vehicle can include a data store. The data store can be coupled to the processing component. The data store can contain a value for an external parameter for execution of the control algorithm. The processing component can be configured to adjust the control input based on the value for the external parameter. The value for the external parameter may have been received by the processing component by a vehicle simulation system.

The vehicle simulation system may have generated the value for the external parameter by simulating the vehicle operation across a range of one or more operational parameters. The vehicle simulation system may have determined an optimum value for the external parameter based on a result for the simulation of the vehicle operation.

The vehicle simulation system may have simulated the vehicle operation across the range of the one or more operational parameters by solving a vehicle control problem. The vehicle control problem may have been be configured to solve for how the vehicle performs in simulation of a vehicle maneuver across the range of the one or more operational parameters. The vehicle simulation system may have determining a solution for the vehicle control problem, the solution based on the vehicle's performance in simulation of the vehicle maneuver. The vehicle simulation system may have determined the optimum value based on the solution.

The vehicle control problem may be a model predictive control problem, and the control algorithm can include the model predictive control problem. The value for the external parameter may have been determined by simulating a vehicle maneuver across a range for one or more other external parameters.

The processing component can be configured to adjust the control input so that the vehicle performs a vehicle maneuver. The value for the external parameter can be updated based on an outcome of the performance of the vehicle maneuver.

The one or more operational parameters can include a vehicle parameter. The one or more operational parameters can include a controls parameter. The control algorithm can include a model predictive control problem which controls the control input based on a current vehicle state, predicted boundaries for values of the one or more operational parameters, and a future vehicle state determined based on the predicted boundaries for values of the one or more operational parameters.

The vehicle parameter can include a distance a from the center of gravity (CG) to a front axle of the vehicle, a distance b from the center of gravity (CG) to a rear axle of the vehicle, a distance L from the center of the front axle to the center of the rear axle of the vehicle, a tire distance from the CG to the rear axle of the vehicle, a vehicle speed $V_x$, a vehicle yaw rate r, vehicle sideslip angle $\beta$, front steering angle $\delta$, front and rear lateral tire forces $F_{yf}$ and $F_{yf}$, a vehicle mass m, a yaw inertia $I_{zz}$, a height h of the vehicle's CG, a wheel radius R, a cornering stiffness C, a front axle cornering stiffness $C_{af}$, or a rear axle cornering stiffness $C_{ar}$.

The vehicle parameter can include a distance a from the center of gravity (CG) to a front axle of the vehicle, a distance b from the center of gravity (CG) to a rear axle of the vehicle, a distance L from the center of the front axle to the center of the rear axle of the vehicle, a tire distance from the CG to the rear axle of the vehicle, a vehicle speed $V_x$, a vehicle yaw rate r, vehicle sideslip angle $\beta$, front steering angle $\delta$, front and rear lateral tire forces and $F_{yf}$ and $F_{yr}$, a vehicle mass m, a yaw inertia $I_{zz}$, a height h of the vehicle's CG, a wheel radius R, a cornering stiffness C, a front axle cornering stiffness $C_{af}$, or a rear axle cornering stiffness $C_{ar}$.

The external parameter can include at least one of a friction coefficient between at least one tire of the vehicle and the road, a gravitational constant, a road surface roughness, an external humidity, a wind vector, or external temperature.

The controls parameter can include a gain Q on the vehicle state, a gain R on an input to the model predictive controller, or a gain W on a slack to the vehicle state.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Vehicle Systems

Figure 1:
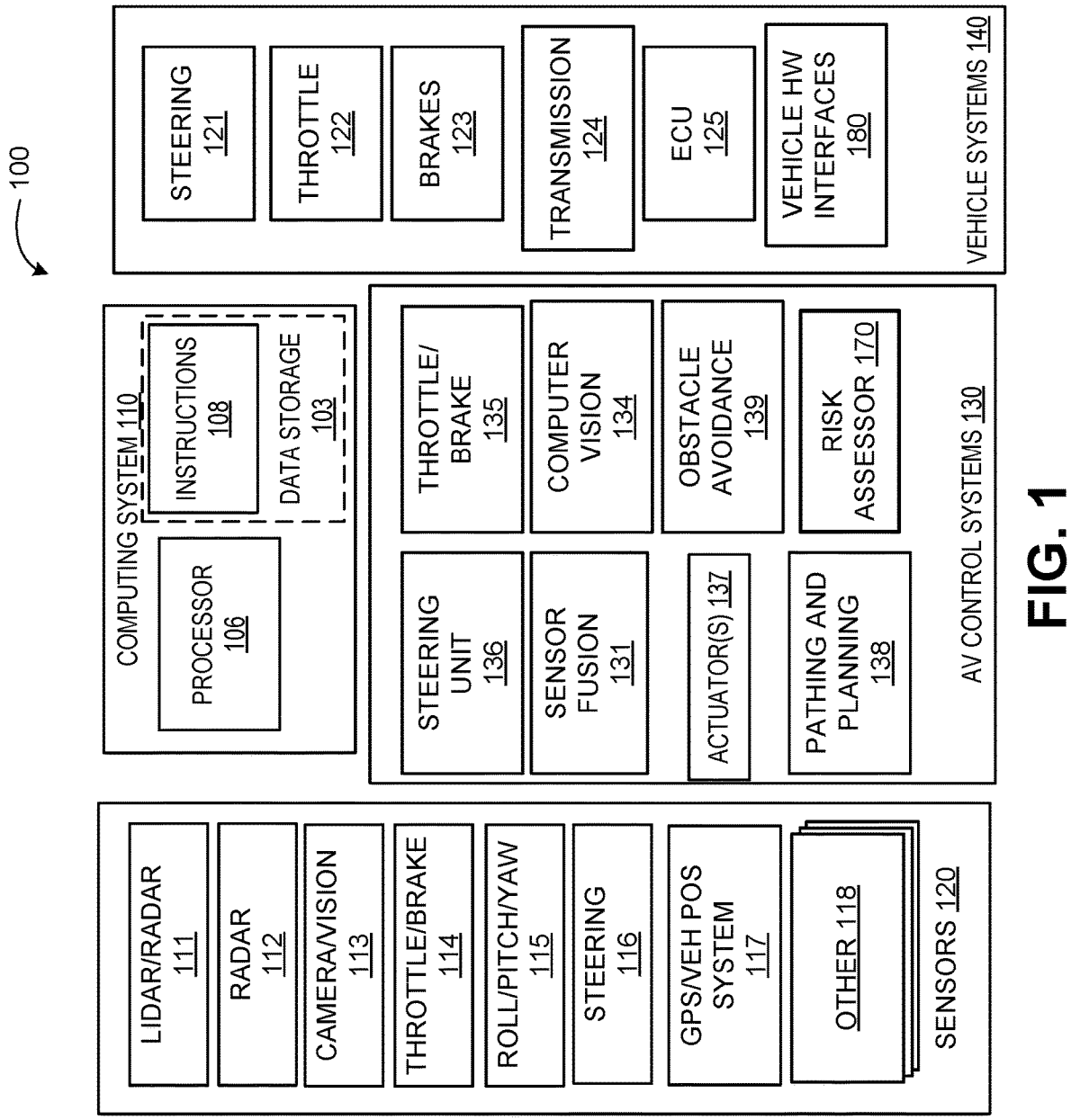
FIG. 1 illustrates an example autonomous or semi-autonomous vehicle with which embodiments of the disclosed technology may be implemented.

FIG. 1 illustrates an example autonomous or semi-autonomous vehicle with which embodiments of the disclosed technology may be implemented. As described herein, vehicle 100 can refer to a real vehicle, whereby the vehicle 100 and the vehicle 100 components In this example, vehicle 100 includes a computing system 110, sensors 120, AV control systems, 130 and vehicle systems 140. Either of the computing system 110, sensors 120, AV control systems 130, or vehicle systems 130 can be part of an automated vehicle system/advanced driver assistance system (ADAS). ADAS can provide navigation control signals (e.g. control signals to actuate the vehicle and operate one or more vehicle systems 140 as shown in FIG. 1) for the vehicle to navigate a variety of situations. As used herein, ADAS can be an autonomous vehicle control system adapted for any level of vehicle control and driving autonomy. For example, the ADAS can be adapted for either level 1, level 2, level 3, level 4, or level 5 autonomy. ADAS can allow for control mode blending (i.e. blending of autonomous and assisted control modes with human driver control). ADAS can correspond to a real-time machine perception system for vehicle actuation in a multi-vehicle environment. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include light detection and ranging (LiDAR) sensor 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as LiDAR sensor 111, radar 112, IR sensors and other like sensors can be used to gather data to measure distances and closing rates to various external objects such as other vehicles, traffic signs, pedestrians, light poles and other objects. Image sensors 111 can include one or more cameras or other image sensors to capture images of the environment around the vehicle as well as internal to the vehicle. Information from image sensors 113 (e.g. camera) can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Other sensors 118 may be provided as well. Other sensors 118 can include vehicle acceleration sensors, vehicle speed sensors, wheelspin sensors (e.g. one for each wheel), a tire pressure monitoring sensor (e.g. one for each tire), vehicle clearance sensors, left-right and front-rear slip ratio sensors, and environmental sensors (e.g. to detect weather, traction conditions, or other environmental conditions. Other sensors 118 can be further included for a given implementation of ADAS. Other sensors 118 can include sensors within a cabin of the vehicle, such as sensors that detect one or more passengers in a cabin of the vehicle. Various sensors 120, such as other sensors 118 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 can include, autonomous driving module (not shown), steering unit 136, throttle and brake control unit 135, sensor fusion module 131, computer vision module 134, pathing and planning module 138, obstacle avoidance module 139, risk assessment module 170 and actuator(s) 137. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing and planning module 138 may be included to compute a desired path for vehicle 100 based on input from various other sensors and systems. For example, pathing and planning module 138 can use information from positioning system 117, sensor fusion module 131, computer vision module 134, obstacle avoidance module 139 (described below) and other systems (e.g. AV control systems 130, sensors 120, and vehicle systems 140) to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing and planning module 138 to determine an appropriate path to avoid a detected obstacle.

Pathing and planning module 138 (either alone or in conjunction with one or more other module of AV Control system 130, such as obstacle avoidance module 139, computer vision module 134, and sensor fusion module 131) may also be configured to perform and coordinate one or more vehicle maneuver. Example vehicle maneuvers can include at least one of a path tracking, corridor keeping, stabilization, or collision avoidance maneuver.

Vehicle systems 140 may include a plurality of different systems/subsystems to control operation of vehicle 100. In this example, vehicle systems 130 include steering system 121, throttle system 122, brakes 123, transmission 124, electronic control unit (ECU) 125 and propulsion system 126, vehicle hardware interfaces 180. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. When control is assumed, computing system 110 and av control system 130 can provide vehicle control systems to vehicle hardware interfaces for controlled systems such as steering angle 121, brakes 123, throttle 122, or other hardware interfaces 180 such as traction force, turn signals, horn, lights, etc. This may also include an assist mode in which the vehicle takes over partial control or activates ADAS controls (e.g. AC control systems 130) to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes. For example, memory 103 can include mapping data, vehicle dynamics data, computer vision recognition data, and other data which can be useful for the execution of one or more vehicle maneuvers, for example by one or more modules of the av control systems 130.

Although one computing system 130 is illustrated in FIG. 1, in various embodiments multiple computing systems 110 can be included. Additionally, one or more systems and subsystems of vehicle 100 can include its own dedicated or shared computing system 130, or a variant thereof. Accordingly, although computing system 110 is illustrated as a discrete computing system, this is for ease of illustration only, and computing system 110 can be distributed among various vehicle systems or components.

Vehicle 100 may also include a (wireless or wired) communication system (not illustrated) to communicate with other vehicles, infrastructure elements, cloud components and other external entities using any of a number of communication protocols including, for example, V2V, V2I and V2X protocols. Such a wireless communication system may include one or more wired or wireless transmitters and receivers to transmit and receive information. For example, a wireless communication system may allow vehicle 100 to receive information from other objects including, for example, map data, data regarding infrastructure elements, data regarding operation and intention of surrounding vehicles, and so on. A wireless communication system may allow vehicle 100 to receive updates to data that can be used to execute one or more vehicle control modes, and vehicle control algorithms as discussed herein. The wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The communication system (not illustrated) can be configured to receive data and other information from sensors 120 that is used in determining whether and to what extent control mode blending should be activated. Additionally, the communication system can be used to send an activation signal or other activation information to various vehicle systems 140 and AV control systems 130 as part of controlling the vehicle. For example, the communication system can be used to send signals to one or more of the vehicle actuators 137 for controlling parameters, for example, maximum steering angle, throttle response, vehicle braking, torque vectoring, and so on.

Pathing and planning module 138 can allow for executing one or more vehicle control mode(s), and vehicle control algorithms in accordance with various implementations of the systems and methods disclosed herein.

In operation, path and planning module 138 (e.g. by a driver intent estimation module, not shown) can receive information regarding human control input used to operate the vehicle. As described above, information from sensors 120, actuators 137 and other systems can be used to determine the type and level of human control input. Path and planning module 138 can use this information to predict driver action. As also described above, information from sensors other systems can be used to determine the state of the driver. Eye state tracking, for example, can be used to estimate driver state. This information can be provided to a risk assessment module 170 to determine the level of risk associated with vehicle operation. Although not illustrated in FIG. 1, where the assessed risk is above a determined threshold, a warning signal can be provided to a driver interface to alert the driver (e.g., audibly or visually) of the risk.

Path and planning module 138 can receive state information such as, for example from visibility maps and hazard maps and local map views. Information from a navigation system can also provide a mission plan including maps and routing to path and planning module 138.

The path and planning module 138 (e.g. by a driver intent estimation module, not shown) can receives this information and predicts behavior characteristics within a future time horizon. This information can be used by path and planning module 138 for executing one or more planning decisions. Planning decisions can be based on one or more policy (such as defensive driving policy).

Path and planning module 138 can receive risk information from risk assessment module 170. Path and planning module 138 can receive vehicle capability and capacity information from one or more vehicle systems 140. Vehicle capability can be assessed, for example, by receiving information from vehicle hardware interfaces 180 to determine vehicle capabilities and identify a reachable set model. Path and planning module 138 can receive surrounding environment information (e.g. from computer vision module 134, or obstacle avoidance module 139). Path and planning module 138 can apply risk information, vehicle capability information and vehicle capacity information to trajectory information (e.g. based on a planned trajectory or driver intent) to determine a safe or optimized trajectory for the vehicle given the drivers intent, and given one or more obstacles in the surrounding environment. This trajectory information can be provided to controller to provide partial or full vehicle control with increasing risk levels. A signal from risk assessment module 574 can be used to trigger controller 586 to take over partial or full control of the vehicle.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicles or platforms.

Simulation Systems for Parameter Determination

Simulation systems can be developed to simulate one or more vehicles, for example vehicle 100 as shown in FIG. 1. Vehicle simulation systems as described herein can allow for simulating one or more operations, such as vehicle navigation and vehicle maneuvers. This can allow for rapidly testing vehicles (in and outside of simulation), across one or more operational parameters. Vehicle simulation systems can, for example by machine learning, allow for learning (e.g. within the simulation environment) one or more parameters which can be used for navigation of a (real, non-simulated) vehicle through a real environment.

Vehicle simulation systems can simulate the vehicle dynamics of the ego vehicle, and one or more vehicle parameters for the vehicle. Vehicle simulation systems can include as part of the simulation one or more vehicle environments. Vehicle simulation systems can simulate the operation of (e.g. navigation, maneuver, control) of a simulated vehicle within one or more vehicle environments. Vehicle simulation systems can simulate one or more vehicle operations, such as navigation and/or maneuvers of the ego vehicle through the one or more vehicle environments. Vehicle simulation systems can simulate one or more vehicle operations by simulating the control of the ego vehicle across one or more controls parameters.

Figure 2A:
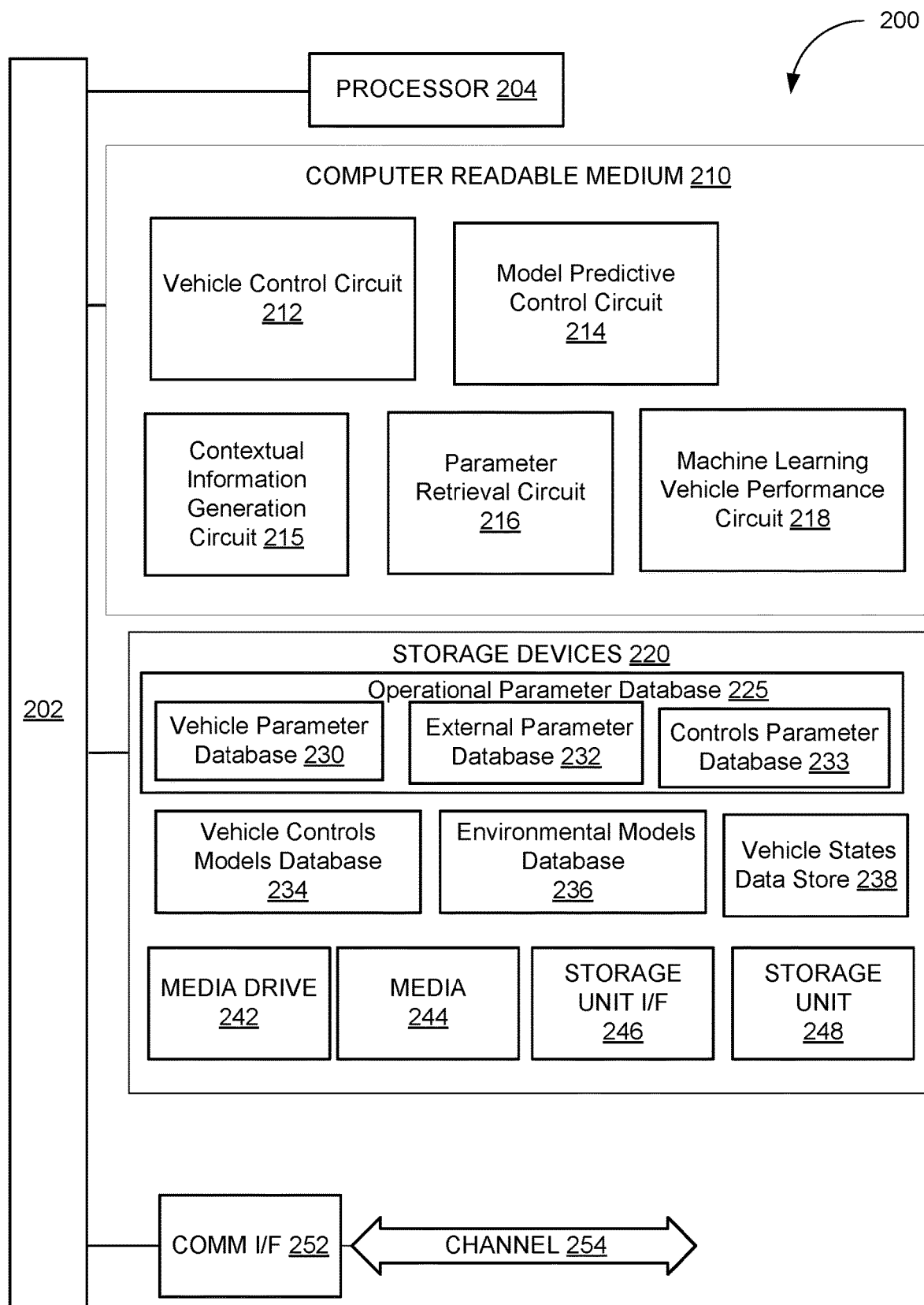
FIG. 2A shows an example simulation system for simulating vehicle maneuvers across one or more operational parameters according to embodiments of the present disclosure.

FIG. 2A shows an example block diagram of a simulation system 200 for simulating vehicle maneuvers across one or more parameters according to embodiments of the present disclosure. Simulation system 200 can include a bus 202 or other communication mechanism for communicating information. Simulation system 200 can include one or more processors 204 coupled with bus 202 for processing information. Processor 204 can be a hardware processor. Processor 204 can include one or more GPUs, CPUs, microprocessors or any other suitable processing elements. Processor 204 may include one or more single core or multicore processors. Processor 204 can execute one or more instructions stored in a non-transitory computer readable medium 210. Computer readable medium 210 can include a main memory, other auxiliary memory, such as a random access memory (RAM), cache and other dynamic storage device(s).

Computer readable medium 110 can contain one or more logical circuits. Logical circuits can include one or more machine-readable instructions which can be executable by processor 204 or another processor. Logical circuits can include one or more instruction components. Instruction components can include one or more computer program components. For example, vehicle control circuit 212, model predictive control circuit 214, parameter retrieval logical circuit 216, and machine learning vehicle performance circuit 218. At least one of these logical circuits (or other logical circuits which are not shown) can allow for simulating one or more vehicle(s) in a simulation environment.

Vehicle control circuit 212 can be configured to simulate one or more vehicle(s). For example, with reference to the example vehicle 100 shown in FIG. 1, vehicle control circuit 212 can simulate the operation of one or more components of vehicle 100, such as sensors 120, computing system 110, AV control systems 130, and vehicle systems 140. Vehicle control circuit 212 can be configured to simulate, for example an ADAS, and a driver (i.e. to simulate any level of autonomy).

Vehicle control circuit 212 can contain and operate one or more vehicle control algorithms and models. Vehicle control algorithms can allow for automating one or more sensors(s) (e.g. sensor 120), and or control system (e.g. actuator 137), so that the simulated vehicle can navigate a vehicle and perform one or more vehicle maneuver(s). Vehicle control circuit 212 can simulate for example, vehicle performance in one or more environments, and vehicle response to one or more events.

Vehicle control circuit 212 can perform, for example, one or more vehicle maneuvers, such as a path tracking, corridor (e.g. lane) keeping, stabilization, or collision avoidance maneuver. Vehicle control circuit 212 can operate a vehicle controller which is any combination of passive (i.e. reactive), and preventative (i.e. proactive). For example, vehicle controller can be preventative, in that the vehicle controller can be configured to enforce an envelope of nominal and safe vehicle states, and prevent the vehicle from breaching one or more enforced handling limits.

In simulation system 100, one or more simulated vehicle control algorithms can be mapped to one or more vehicle control algorithms to be used on a real vehicle (e.g. vehicle 100). Thus, there can be a correspondence between a component of a simulated vehicle and components of the actual vehicle, and a control algorithm for the simulated vehicle with (at least a portion of) a control algorithm for a real vehicle (e.g. vehicle 100). Thus, vehicle control circuit 212, alone, and in conjunction with one or more other logical circuits, such as model predictive control circuit 214, can simulate vehicle operation (e.g., navigation, maneuver, control) of a simulated vehicle, within a simulated environment. For example, one or more other logical circuits can be configured to operate and execute one or more algorithms which may be necessary for executing one or more operations of vehicle control circuit 212. As another example, one or more other logical circuits can solve one or more control problems which can then be used by the vehicle control circuit 212.

Vehicle control circuit 212 can further include one or more components, which can be instruction components (e.g. computer program components). For example, with reference to vehicle 100 shown in FIG. 1, vehicle control circuit 212 can include one or more vehicle simulation components (not shown) for simulating the operation of one or more actual components of vehicle 100, such as sensors 120, computing system 110, AV control systems 130, and vehicle systems 140. Other components of vehicle control circuit 212 can include operational information determination component, contextual information determination component, vehicle state determination component, future vehicle state prediction component, boundary determination component, and trajectory threshold determination component (not illustrated in FIG. 2A, but for clarity illustrated in FIG. 2B).

Operational information determination component may be configured to determine operational information. The operational information may be based on information generated by computer program or instruction implementations of one or more vehicle components (e.g. actual components of vehicle 100, such as sensors 120, computing system 110, AV control systems 130, or vehicle systems 140.) Thus, operational information for the simulated vehicle can relate to operational information of real vehicles. Operational information can include values for one or more operational parameters for the vehicle, including vehicle parameters, external parameters, and controls parameters. Operational parameters generally can refer to parameters which can be necessary to operate a vehicle model. These can be parameters needed for vehicle control (e.g. by ADAS).

Determination may include identifying the yaw rate, sideslip, slip angle, heading, and other operational information of vehicle such that the values of all or some of the operational parameters are identified; identifying if operational parameter values have normal or abnormal quantities; identifying if operational parameter values have near abnormal quantities, identifying extreme excess or extreme deficiency of operational parameter values.

Contextual information determination component may be configured to determine contextual information. The contextual information may characterize the surrounding contextual environment of the vehicle. Contextual information can include one or more objects and features of a surrounding environment to the vehicle. Determination of the contextual information may be based on output signals (i.e. signals as generated by one or more components of the vehicle, e.g. sensors 120). If the vehicle is being simulated, these output signals can be one or more simulated output signals. Determination of the contextual information may include identifying obstacles, identifying motion of obstacles, estimating distances between the vehicle and other vehicles, identifying lane markings, identifying traffic lane markings, identifying traffic signs and signals, identifying crosswalk indicators, identifying upcoming curvature of the roadway, and other determinations. Determination of the contextual information may include identification of ambient conditions such as temperature, rain, snow, hail, fog, and other ambient conditions that may affect control of vehicle.

By way of example, contextual information characterizing the contextual environment of vehicle 100 may include values of contextual parameters including direction of travel is North, roadway is three lanes, no roadway shoulder, guardrails constrain the roadway, there are lane boundaries in the roadway, vehicle is in middle lane, there is secondary vehicle ahead of vehicle in the lane to the left at a given distance. Contextual information characterizing the contextual environment of the vehicle can include values for one or more external parameters. External parameters can be such parameters which are not directly, or only, affected by the vehicle. For example, external parameters can have values affect by something outside of the control of the vehicle.

The vehicle state determination component may be configured to determine a current vehicle state of the vehicle. The determination of the current vehicle state may be based on the operational information and the contextual information (e.g. by determined values for vehicle parameters and external parameters). The current vehicle state may represent, for example, a current set of values of a set of operational parameters of the vehicle, a current set of values of a set of contextual parameters and a current set of values of a set of vehicle parameters of the vehicle, and external parameters external to the vehicle. The current vehicle state may be indicative of items such as the vehicle's stability at a point in time and the vehicle's surrounding environment at a point in time.

The future vehicle state prediction component may be configured to determine a future vehicle state of the vehicle. The future vehicle state of the vehicle may be based on the current vehicle state determined (e.g. by currently vehicle state component). The future vehicle state may include what a driver of the vehicle is likely to do, a position on the roadway likely to be travelled towards, obstacles on the roadway and their movements, prior vehicle states determined, etc. Determination may occur at different levels of granularity, and may occur at varying time horizons. In some implementations, more than one future vehicle state may be determined at varying time horizons.

The boundary determination component may be configured to determine predicted boundaries of the operational information. Determination may be based on the operational information. A breach of the predicted boundaries may indicate undesirable values of the operational parameters of the vehicle such that the values are nearing the operational constraints of the vehicle. A breach of the predicted boundaries may include exceeding one or more values of the operational parameters or calculated values based on values of the operational parameters. Nearing, arriving to, or exceeding the operational constraints of the vehicle may cause the vehicle (or a driver of the vehicle) to lose vehicle stability, lose vehicle control, cause a collision, and cause other vehicle catastrophes. One or more operational parameters (such as weights or gains of the MPC) can vary how the MPC penalizes for breaching, nearing, arriving to, or exceeding one or more operational constraints of the vehicle. One or more operational parameters (such as weights or gains) can determine how an envelope of nominal or safe vehicle states are enforced.

The trajectory threshold determination component may be configured to determine predicted threshold values of a trajectory metric. Determination may be based on the contextual information and the operational information. The trajectory metric may characterize a trajectory of the vehicle such that the vehicle is traveling on a roadway. The predicted threshold values of the trajectory metric may represent desirable circumventions in order to avoid causing vehicle catastrophes. Vehicle catastrophes may include a collision, losing control of the vehicle, losing vehicle stability, veering into other lanes, or other vehicle catastrophes. By way of non-limiting example, the predicted thresholds of the trajectory metric account for obstacles in the roadway, lane boundaries, roadway boundaries, vehicle width, or other predicted thresholds of the trajectory metric. Roadway boundaries may include guardrails, center medians, specific lane markings, parked vehicles, pedestrians, curbs, sidewalks, opposing direction of travel, concrete barriers, barriers of other materials, traffic cones, and other roadway boundaries. Vehicle width may be accounted for when determining the predicted threshold values such that obstacles and boundaries may be laterally closer in proximity to a wider vehicle.

Vehicle control circuit 212 may be configured to control the vehicle such that the vehicle may circumvent vehicle catastrophes, and or otherwise sufficiently control the vehicle. Controlling the vehicle may be based on the future vehicle state determined, the predicted boundaries of the operational information, and the predicted trajectory threshold values. Vehicle control circuit 212 may be configured to control the vehicle partially. Implementations where vehicle control circuit 212 controls the vehicle partially includes effectuating a determined corrective response in coordination with the driver's operational input such that the driver maintains a majority of the control of the vehicle and controller 124 guides some operational aspects of the vehicle. The corrective response may include modifying some values of the operational parameters and it may be determined by controller 124.

By way of example, vehicle may be operated by a driver transporting to a destination. Vehicle control circuit 212 may utilize the future vehicle state determined, the predicted boundaries of the operational information, and the predicted trajectory threshold values to correct the driver's driving decisions and decrease vehicle speed and degree of steer upon determination that, for example, vehicle was traveling too fast on a round onramp to a highway such that vehicle may rollover.

Model predictive control circuit 214 can be configured to simulate at least a portion of a control of one or more vehicles, including according to a model predictive control algorithm. Thus, model predictive control circuit 214 can solve one or more model predictive control problem. More specific model predictive control problems and model predictive control algorithms described herein are merely non-limiting examples. It is understood that the model predictive control circuit 214 can solve any model predictive control problem, and apply to any model predictive control algorithm. Vehicle control circuit 212 can operate in conjunction with model predictive control circuit 214, to simulate vehicle navigation, e.g. one or more vehicle maneuvers of the simulated vehicle through the one or more simulated vehicle environments. For example, previously discussed vehicle state determination component, future vehicle state prediction component, boundary determination component, and trajectory threshold determination component (not illustrated) can be components of model predictive control circuit 214 if the vehicle is simulated to utilize one or more model predictive controls and solve a model predictive control problem. In various embodiments, model predictive control circuit 214 can control a vehicle according to a minimization problem, and a state vector. The minimization problem can include minimizing a cost function. In various non-limiting embodiments, solving a MPC can require an iterative solution of optimal control problems, over a prediction horizon, and across certain time steps. In various non-limiting embodiments, the MPC algorithm may be implemented to use MPC with envelope constraints in mind. Envelope constraints may include conditions a solution to the cost function must satisfy. In various embodiments, the MPC algorithm may be implemented with weights or gains on outputs, inputs, and slack. Weights or gains can reflect the relative importance of the variable. Specifics on model predictive controllers that can operate on model predictive control circuit 214 will be explained later.

Contextual information generation circuit 215 can be configured to generate one or more contextual information. The contextual information may include information regarding the surrounding contextual environment of the vehicle, including other vehicles and obstacles. Contextual information can include one or more objects and features of a surrounding environment to the vehicle. It can be understood that although contextual information can be generated, the generated contextual information may or may not be same as determined contextual information (i.e. as determined by contextual information determination component of vehicle control circuit 212). Determination of the contextual information may include identifying obstacles, identifying motion of obstacles, estimating distances between the vehicle and other vehicles, identifying lane markings, identifying traffic lane markings, identifying traffic signs and signals, identifying crosswalk indicators, identifying upcoming curvature of the roadway, and other determinations. Determination of the contextual information may include identification of ambient conditions such as temperature, rain, snow, hail, fog, and other ambient conditions that may affect control of vehicle.

Parameter retrieval logical circuit 216 can be configured to retrieve one or more parameters for the simulated vehicle navigation.

The simulation system 100 can utilize machine learning to determine or more parameters, such as operational parameters for a vehicle control algorithm. Machine learning vehicle performance circuit 218 can be configured to operate one or more machine learning algorithms. Machine learning algorithms can be used to determine and learn one or more parameters as discussed herein, such as operation parameters. Parameters can be fixed and updated (e.g. updated during operation of the control algorithm) parameters, which allow for the vehicle control algorithm to be executed (e.g. by vehicle control circuit 212 and another logical circuit). Machine learning vehicle performance circuit 218 can operate one or more machine learning algorithms, and deep learning algorithms. For example, such algorithms can be implemented as at least one of a feedforward neural network, convolutional neural network, long short-memory network, autoencoder network, deconvolutional network, support vector machine, inference and trained neural network, or recurrent neural network, etc. Such algorithms can include supervised, unsupervised, and reinforced learning algorithms. For example, machine learning vehicle performance circuit 218 can allow for performing one or more learning, classification, tracking, and recognition tasks.

The machine learning vehicle performance circuit can be trained. The machine learning vehicle performance circuit can be trained by simulating, by the vehicle control circuit (or another control circuit of simulation system 200), a vehicle maneuver or navigation, and determining one or more outcomes for the vehicle maneuver or navigation. For example, the simulation system 200 can determine one or more values for operational parameters based on the outcomes.

Simulation system 200 can include one or more storage devices 220. Storage devices 220 can include one or more databases. For example, there can be an operational parameter database 225. Operational parameter database 225 can include operational information for specific one or more simulated vehicles, and possible ranges for such operational information. In some implementations, operational information can include contextual information for the vehicle and vehicle operational information, including as determined by or for vehicle control circuit 212. In some implementations, the operational information and corresponding data stored in operational parameter database 225 may be stored temporarily such as until a simulation of a vehicle navigation is over, until the end of the day, until required parameter information is generated, until the end of the week, until the end of the month, until the end of the year, or until it is manually cleared.

One or more operational parameters can be stored in operational parameter database 225. These can be parameters to be retrieved by the previously discussed parameter retrieval logical circuit 216.

Operational parameter database 225 can include vehicle parameter database 230, external parameters database 232, and controls parameters database 233. Operational parameters database 225 can include values for operational parameters. Values for operational parameters can include range(s) for the values, constraints on the values, limits on the values, maximum values, minimum values, average values, optimum values, or other possible values. For example, parameters in either the vehicle parameter database 230, external parameters database 232, and controls parameters database 233 can include ranges and possible values for such parameters, and values for limits on those ranges, such as maximum or minimum values.

Vehicle parameters can be stored in vehicle parameter database 230. Example vehicle parameters include values for vehicle related operational information. Example vehicle parameters can include a distance a from the center of gravity (CG) to a front axle of the vehicle, a distance b from the center of gravity (CG) to a rear axle of the vehicle, a distance L from the center of the front axle to the center of the rear axle of the vehicle, a tire distance from the CG to the rear axle of the vehicle, a vehicle speed $V_x$, a vehicle yaw rate r, vehicle sideslip angle $\beta$, front steering angle $\delta$, front and rear lateral tire forces $F_{yf}$ and $F_{yr}$, a vehicle mass m, a yaw inertia $I_{zz}$, a height h of the vehicle's CG, a wheel radius R, a cornering stiffness C, a front axle cornering stiffness $C_{af}$, or a rear axle cornering stiffness $C_{ar}$. Other vehicle parameters can include one or more drag coefficient for a vehicle, or inertial parameters.

Various vehicle parameter definitions for example vehicle parameters are provided in Table 1.

TABLE 1

Vehicle Parameter Definitions

| Parameter | Units | Description |
|---|---|---|
| g | m/s$^1$ | Gravitational constant |
| P | | Coefficient of friction between tire and road |
| a | M | Distance from CG to front axle center |
| b | M | Distance from CG to rear axle center |
| L | M | Distance from front axle center to rear axle center |
| m | kg | Total vehicle mass |
| Izz | Kgm$^2$ | Yaw Inertia |
| h | M | CG height |
| $c_a$ | N/rad | Cornering stiffness |
| $c_{af}$ | kN/rad | Front axle cornering stiffness |
| Car | kN/rad | Rear axle cornering stiffness |
| p. | M | Wheel radius |

External parameters can include values for one or more contextual information. External parameters can include values for one or more information external to the vehicle. External parameters can be stored in external parameter database 232. External parameters can include friction coefficient between at least one tire and the road, a gravitational constant, a road surface roughness, an external humidity, a wind vector, and an external temperature. In embodiments for real vehicles, some external parameters can be difficult to measure in real time These external parameters can also be unmeasured or unmeasurable. For example, these parameters can require the presence of one or more sensors and coordination of data from such sensors (e.g. by sensor fusion module 131), which can be difficult to determine in real-time or near real-time.

Other operational parameters can include values for one or more controls parameters. Controls parameters can be parameters for controlling the vehicle. These can be stored in controls parameter database 233. Controls parameters can include, for example, one or more weights, gains, slack variables, and biases for control algorithms for controlling a vehicle. For example, controls parameters can relate to controlling the vehicle by solving a model predictive control problem. Further, controls parameters can be controls parameters for one or more vehicle states in modelling vehicle control and vehicle operation.

For example, controls parameters such as weights, gains, or biases, can be costs on a vehicle state (e.g. a present vehicle state or a future or predicted vehicle state), a cost on inputs to the model predictive control problem, or costs on a controlled variable. Controls parameters such as weights, gains, or biases can be based on at least one of: a cost Q on a vehicle state (e.g. vehicle sideslip angle β or vehicle yaw rate r), a cost R on an input to the model predictive control problem, such as cost on a controlled variable (e.g. front lateral force, acceleration, etc.), or a cost W on a slack to the vehicle state. The cost Q on the vehicle state, the cost R on the input, or the cost W on the slack can be based on one or more vehicle parameters. Such vehicle parameters can include a vehicle yaw rate r, vehicle sideslip angle β. Such vehicle parameters can include minimum or maximum values thereof.

In some implementations, the current vehicle state, predicted vehicle state, and future vehicle state, determined by vehicle control circuit 212 (e.g. by one or more components thereof) may be stored in electronic storage 220 and considered a prior vehicle state. In some implementations, the current vehicle state may be stored temporarily such as until a drive is over, until the end of the day, until the end of the week, until the end of the month, until the end of the year, or until it is manually cleared.

As another example of storage device(s) 220, there can be a vehicle controls models database 234. Vehicle control models database 234 can include information necessary for simulating one or more vehicle navigation, maneuver, or portion thereof. For example, the vehicle controls models database 234 can contain one or more vehicle controls algorithms or models, and associated controls parameters such as weights, gains, or biases. For example, vehicle controls models can include vehicle handling models which model how the vehicle will react to certain driving conditions. Vehicle controls models database 234 can include one or more models for how a tire can react to lateral and longitudinal tire forces. For example, vehicle controls models database 234 can include lateral brush tire model. Apart from vehicle controls models, vehicle controls models database 234 can include one or more driving, driver, and vehicle control models, such as a human driver model. Vehicle controls models database 234 can include models for a control mode for the vehicle, such as control mode blending.

Moreover, the simulation system 200 can include an environment models database 236 which can generally include information for simulating one or more regarding one environment. For example, environment models database 236 can include one or more mapping data (such as the locations for mapped features such as roads, highways, traffic lanes, buildings, parking spots, etc.), infrastructure data (such as locations, timing, etc. for traffic signals), or more terrain (such as the inclinations across one or more axes for features in the mapping data) weather.

The simulation system 200 may also include one or more various forms of information storage devices 220, which may include, for example, a media drive 222 and a storage unit interface 226. The media drive 222 may include a drive or other mechanism to support fixed or removable storage media 224. For example, a hard disk drive, a floppy disk drive, a magnetic tape drive, an optical disk drive, a CD or DVD drive (R or RW), or other removable or fixed media drive may be provided. Accordingly, storage media 224 may include, for example, a hard disk, a floppy disk, magnetic tape, cartridge, optical disk, a CD or DVD, or other fixed or removable medium that is read by, written to or accessed by media drive 122. As these examples illustrate, the storage media 224 can include a computer usable storage medium having stored therein computer software or data.

In some embodiments, information storage devices 220 may include other similar instrumentalities for allowing computer programs or other instructions or data to be loaded into the simulation system 200. Such instrumentalities may include, for example, a fixed or removable storage unit 228 and an interface 226. Examples of such storage units 228 and interfaces 226 can include a program cartridge and cartridge interface, a removable memory (for example, a flash memory or other removable memory engine) and memory slot, and other fixed or removable storage units 228 and interfaces 226 that allow software and data to be transferred from the storage unit 228 to the simulation system 400.

Simulation system 200 may also include a communications interface 252. Communications interface 252 may be used to allow software and data to be transferred between computing system 200, another device, and an external devices. Examples of communications interface 252 may include a modem or softmodem, a network interface (such as an Ethernet, network interface card, WiMedia, IEEE 102.XX or other interface), a communications port (such as for example, a USB port, IR port, RS232 port Bluetooth® interface, or other port), or other communications interface. Software and data transferred via communications interface 252 may typically be carried on signals, which can be electronic, radio, electromagnetic (which includes optical) or other signals capable of being exchanged by a given communications interface 252. These signals may be provided to communications interface 252 via a channel 254. This channel 254 may carry signals and may be implemented using a wired or wireless communication medium. Some examples of a channel may include a phone line, a cellular link, an RF link, an optical link, a network interface, a local or wide area network, and other wired or wireless communications channels.

In embodiments, communications interface 252 can be used to transfer information to and/or from one or more real (i.e. non-simulation) vehicle or infrastructure. In some embodiments, some or all information stored in storage devices 220 can be information retrieved from (or to be provided to) one or more real (i.e. non-simulation) vehicles or real (i.e. non-simulation) environments (e.g. by one or more real world infrastructure).

In some examples, a user running one or more vehicle navigation simulations can update information in storage devices 220, or one the information at one or more logical circuits, by a graphical user interface (GUI) or another interface (e.g. an interface corresponding to a simulation control that can be coupled to communications interface 252).

In some embodiments, one or more data or information or described herein can be displayed on the GUI. In one example implementation, the user selects at the graphical interface, which vehicles, environments, contexts, and vehicle navigation or maneuvers to simulate. In example implementations, the user can select one or more operational parameters (e.g. vehicle parameters, external parameters, controls parameters, etc.) or ranges thereof. In this and in other implementations, the simulation system 200 can output (e.g. at GUI, over communication interface 252, and stored in a storage device 220 e.g. storage media 224) one or more optimized parameters. In this and in other implementations, the simulation system 200 can output (e.g. at GUI, over communication interface 252, and stored in a storage device 220 e.g. storage media 224) one or more training data and training data sets. Training data and training data sets can include values for one or more operational parameters, including optimized parameters. Training data and training data sets can be configured to be used on real vehicles (e.g. non-simulated vehicles). As described herein, optimized or operational parameters can be parameters to be used in conjunction with one or more real (i.e. non-simulation) vehicles. Such optimized parameters can be vehicle parameters and external or environmental parameters. Such optimized parameters can be controls parameters such as weights, gains, and biases for one or more vehicle control algorithms, such as weights, gains, and biases related to a model predictive control problem.

In some embodiments, one or more simulated vehicle navigation can be displayed on the GUI. As such, simulation systems 200 as described herein can contain one or more visualization components which allow for the visual (or other) rendering of one or more simulated vehicles, vehicle dynamics, and simulated environments. For example, simulation system 200 may allow for the display of example vehicle navigation through simulated environment. For example, simulation system 200 may allow for simulation and display of one or more vehicle maneuvers, based on one or more parameters as described herein. The simulation system 200 can automatically determine if the vehicle maneuver or vehicle navigation was successfully or unsuccessfully performed, however a feedback from a user can be used to confirm (or not) such predicted successful and unsuccessful maneuver.

In this document, the terms "computer program medium" and "computer usable medium" are used to generally refer to media such as, for example, bus 202, computer readable medium 210, storage unit 246, media 244, and channel 254. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the simulation system 200 to perform features or functions of the disclosed technology as discussed herein.

Figure 2B:
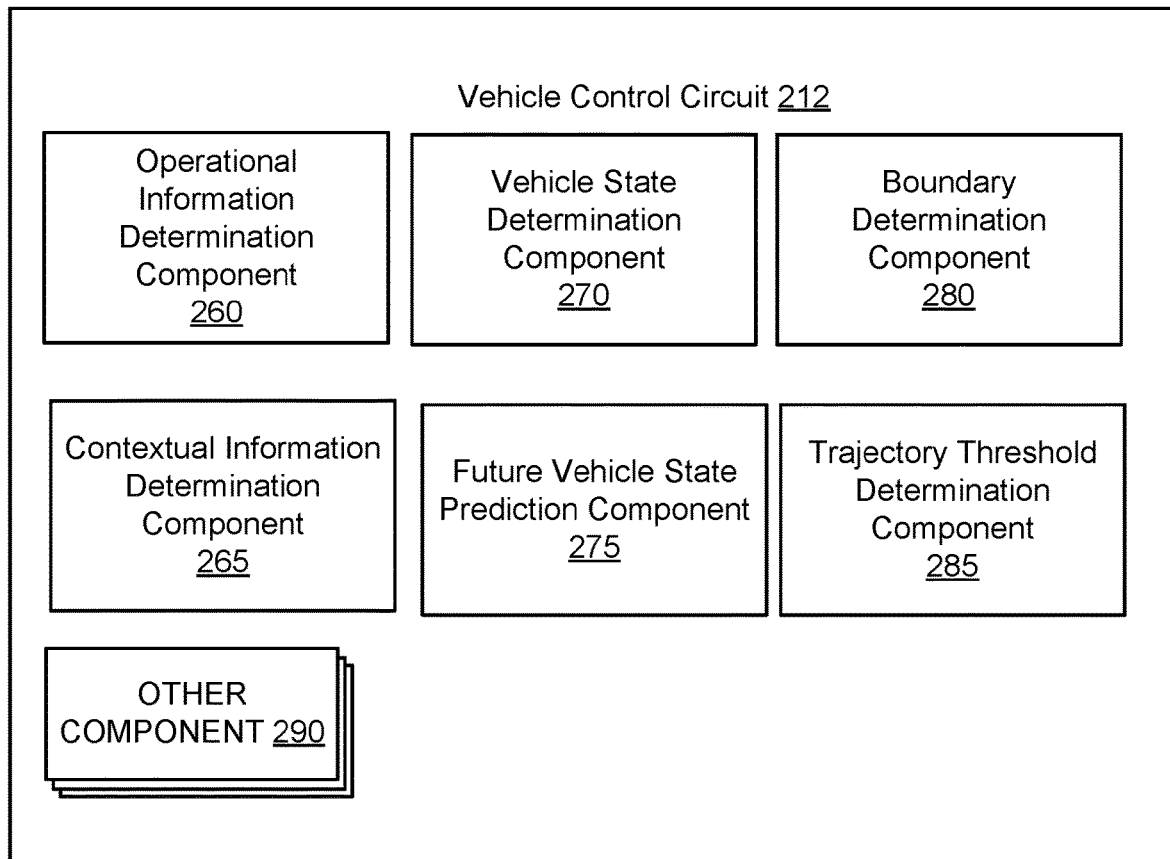
FIG. 2B shows an example further detailed vehicle control circuit which can be part of a simulation system for simulating vehicle maneuvers, according to embodiments of the present disclosure.

FIG. 2B shows an example vehicle control circuit, which can be vehicle control circuit 212 as previously described.

As previously discussed, vehicle control circuit 212 can include operational information determination component 260, contextual information determination component 265, vehicle state determination component 270, future vehicle state prediction component 275, boundary determination component 280, and trajectory threshold determination component 285. Such components, including as previously described with reference to FIG. 2A are illustrated in FIG. 2B. Vehicle control circuit 212 can include other component(s) 290. As previously discussed vehicle control circuit 212 can simulate the operation of one or more components of vehicle 100, such as sensors 120, computing system 110, AV control systems 130, and vehicle systems 140. Thus, the other component 290 can include a vehicle simulation or emulation component. For example, simulation components can allow for rendering of the vehicle (e.g. at a GUI, or in memory). Further, vehicle control circuit 212 can be able to simulate a driver (i.e. to simulate any level of autonomy). Thus, vehicle control circuit 212 can contain another component 290 configured to simulate or emulate a driver and driving behavior. It can be understood that another component 290 can include components configured to interface with other logical circuits of the simulation system 200. Another component 290 can simulate or emulate vehicle control and navigation. Embodiments of vehicle control circuit 212 can be embodied without one or more components as illustrated and described herein.

Figure 3:
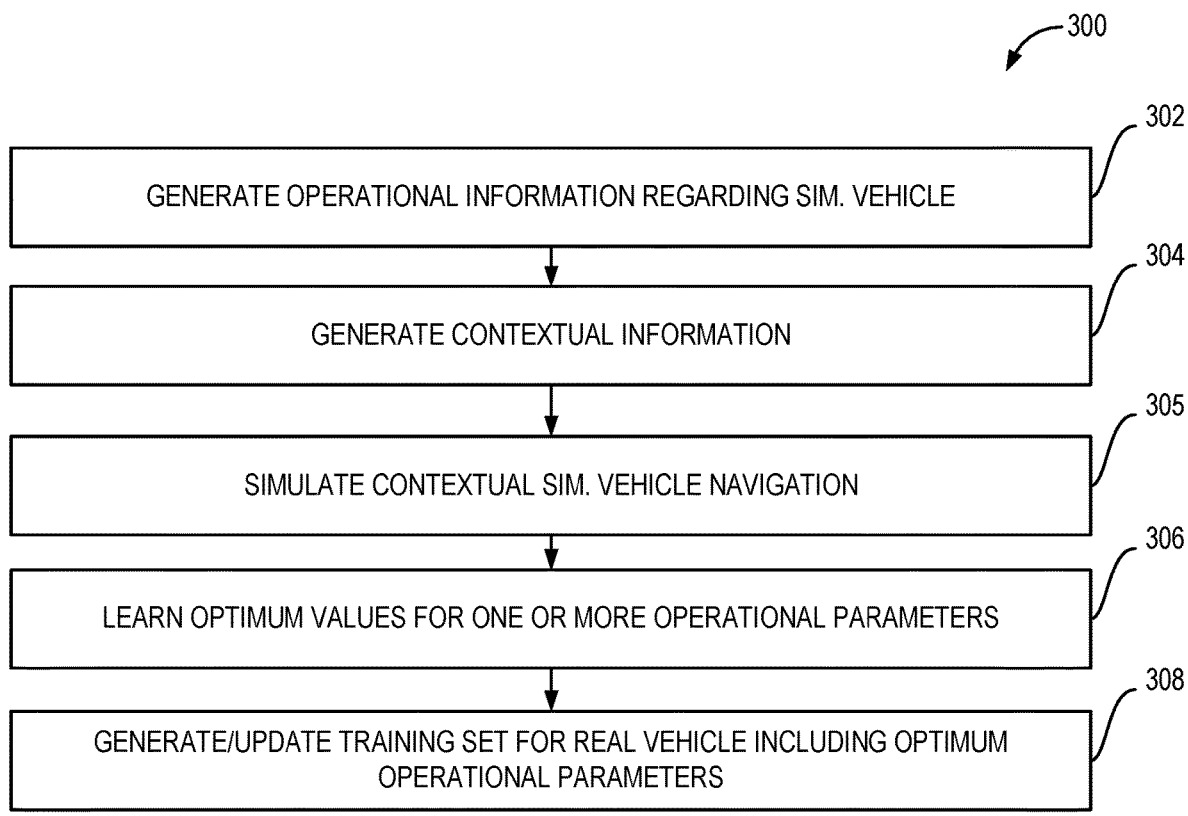
FIG. 3 illustrates an example method for determining one or more operational parameters for a vehicle control algorithm, by simulating vehicle navigation according to embodiments of the present disclosure.
Figure 4:
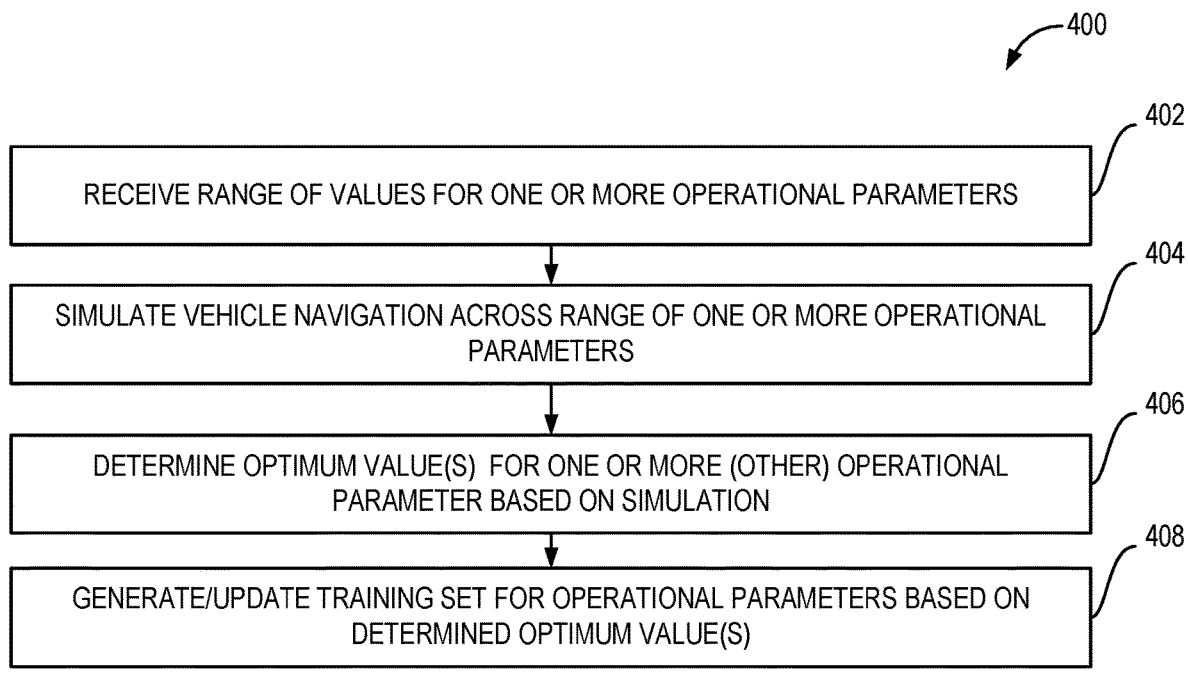
FIG. 4 shows another an example method for determining one or more operational parameters for a vehicle control algorithm, by simulating vehicle navigation according to embodiments of the present disclosure.
Figure 5:
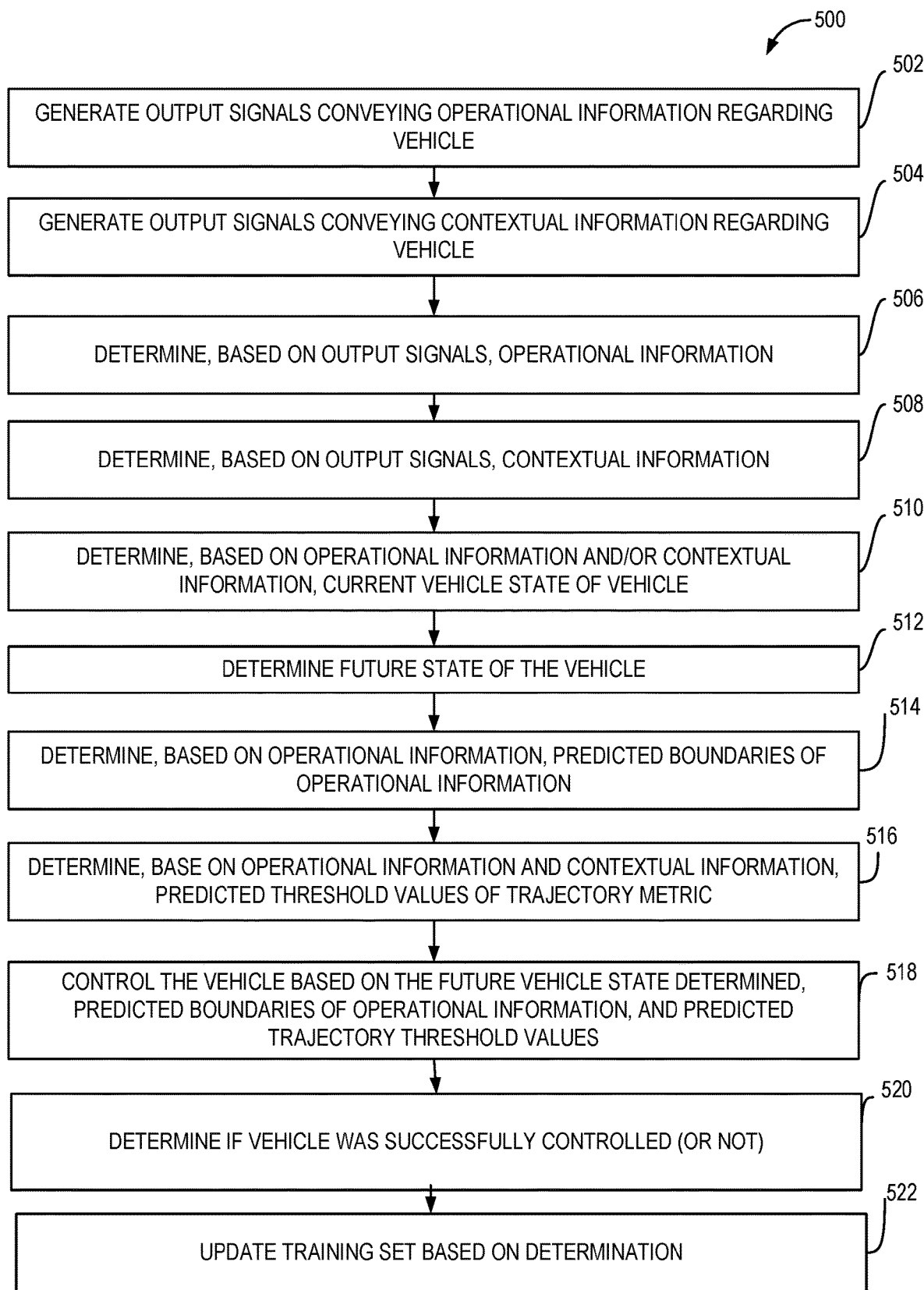
FIG. 5 illustrates yet another example method for determining one or more operational parameters for a vehicle control algorithm, by at least partially controlling operation of a vehicle based on operational constraints of the vehicle or contextual constraints according to embodiments of the present disclosure.

FIG. 3, FIG. 4, and FIG. 5 show example processes for determining one or more parameters, such as operational parameters for a vehicle control algorithm, by simulating vehicle navigation in accordance with one or more implementations. The determined parameters can be optimal values for the parameters. The vehicle control algorithm can be a MPC. The operations of methods 300, 400, 500 are intended to be illustrative. In some implementations, methods 300, 400, 450, 500 may be accomplished with one or more additional operations not described, and without one or more of the operations discussed. Additionally, the order in which the operations of methods 300, 400, 500 are illustrated in FIG. 3. FIG. 4, FIG. 5, and as described herein are not intended to be limiting. Methods 300, 400, 500 shown can be implemented by simulation system 200. Method 500 can additionally be implemented by a real vehicle.

In some implementations, methods 300, 400, 500 may be implemented in one or more processing devices (e.g., a digital processor, an analog processor, a digital circuit designed to process information, an analog circuit designed to process information, a state machine, and other mechanisms for electronically processing information), such as processor 204. The one or more processing devices may include one or more devices executing some or all of the operations of methods 300, 400, and 500 in response to instructions stored electronically on an electronic storage medium (e.g. computer readable medium 210). The one or more processing devices may include one or more devices configured through hardware, firmware, and software to be specifically designed for execution of one or more of the operations of methods 300, 400, 500.

As previously noted, prior systems utilize preset (or fixed) parameters, such as vehicle parameters. However, in the real world, these actual parameters can change. For example, with regards to one example vehicle parameter, the mass of the vehicle, the mass the vehicle can change when the number of occupants of the vehicle changes. The same is true with other vehicle parameters, such as tire stiffness. Tire stiffness can change based on the type of tire that is utilized, the wear and tear on the tire, and other factors. Machine learning can be used to determine the parameters, such as the optimal parameters. The operations of methods 300, 400, 500 are intended to illustrate one or more such machine learning operations, however other machine learning operations are within the scope of the present disclosure.

The optimal parameters can generally be determined by measuring an output, such as how closely the vehicle tracks an expected path and how the vehicle acts when avoiding a collision. The machine learning algorithm can be trained to adjust the parameters of the vehicle to optimize the output.

As previously noted, FIG. 3 shows an example process for determining one or more parameters, such as operational parameters for a vehicle control algorithm, by simulating a vehicle operation in simulation and in accordance with one or more implementations. Method 300 can include operation 302 for generating operational information regarding simulated vehicle. The operational information can be generated as output signals and data conveying operational information regarding the simulated vehicle. As previously discussed operational information for the simulated vehicle can relate to operational information of real vehicles. The operational information may include values (or ranges thereof) of operational parameters of the vehicle. For example, operational parameters can include one or more vehicle parameter, one or more external parameter, and one or more controls parameter. The operational information can be included in operational parameter database 225 (e.g. an external parameter).

Operation 302 may be performed by one or more hardware processors (e.g. processor 204) configured by machine-readable instructions (e.g. vehicle control circuit 212 in computer readable medium 210) including a component that is the same as or similar to sensors 108, in accordance with one or more implementations.

Method 300 can include operation 304 for generating contextual information. The contextual information can include environmental information, but also information for one or more driving scenario, vehicle navigation scenario, etc. For example, the contextual information can include locations and movements for one or more other vehicles in a navigation scenario. The contextual information can information stored in the environmental models database 236, operational parameter database 225 (e.g. an external parameter). The contextual information can include a range for values for one or more parameters. For example, the contextual information can be such that a simulated driving scenario includes the vehicle navigating in a range of environmental conditions. For example, the vehicle can be simulated to drive in a variety of environmental conditions (e.g. ice, sleet, snow, dry road, etc.) which can correspond to a variety of values of road friction. For example, a range of values for an external parameter corresponding to road friction, can include all possible values for road friction.

Operation 304 may be performed by one or more hardware processors (e.g. processor 204) configured by machine-readable instructions (e.g. vehicle control circuit 212 in computer readable medium 210) including a component that is the same as or similar to sensors 108, in accordance with one or more implementations.

Method 300 can include operation 305 for simulating a contextual vehicle navigation. Operation 305 can include simulating navigation, including vehicle navigation that would require one or more vehicle maneuvers (such as path tracking, corridor keeping, stabilization, and collision avoidance maneuver). Simulated vehicle navigation can include as described with reference to FIG. 2A, including as described with reference to vehicle control circuit 212, (and components thereof) and other logical circuits of simulation system 200. The vehicle navigation can be simulated based on contextual information that was generated upon execution of operation 304. Simulating vehicle navigation at operation 305 can include simulating a vehicle with at least a portion of the contextual information that was generated at operation 304. It can be understood that although one or more operational parameters may have been initialized (or forced) for simulation, these initialized parameters can subsequently change as the vehicle navigation is simulated. Moreover, other operational parameters may change depending on the vehicle's navigation in context (e.g. in response to one or more environmental or contextual events in simulation). For example, a coefficient of friction between a tire and road may change depending on a changing tire pressure, or a changing vehicle weight.

Method 300 can include execution of operation 306 for learning optimum values for one or more operational parameters. Optimum values for operational parameters can include the real time values for such parameters. Learning or determining can be accomplished by one or more learning, classification, and recognition operations of machine learning vehicle performance circuit 216. For example, an optimum value for a vehicle weight can include an actual or predicted value (e.g. predicted in simulation) of the vehicle weight. In embodiments, generating optimum values may be useful for parameters which in practice (i.e. on a real vehicle) are not-measured or not measurable. In practice, non-measured or not measurable parameters may be difficult to determine.

In addition, optimum values can include the values for operational parameters which allow for successful navigation of the vehicle. Optimum values for the one or more parameters can correspond to the values of the parameters which were determined by the simulation circuit 200 to allow for the vehicle to at least one of: (i) most closely (e.g. from multiple simulations, or within 0.1%, 0.2%, 0.5%, 1%, 2%, 5%, 10%, 15%, 20%, etc.) track the path in a path tracking maneuver, (ii) most closely keep the vehicle within a corridor in a corridor keeping maneuver, iii) most successfully (e.g. efficiently, smoothly) stabilize the vehicle in a stabilization maneuver, (iv) most successfully (e.g. efficiently or smoothly while avoiding collision) maneuver to avoid vehicle collision in the collision avoidance maneuver, or (v) otherwise navigate the vehicle while avoiding a vehicle catastrophe.

In simulation, the navigation of the vehicle may have led to one or more vehicle catastrophes (e.g. a collision, loss of control of the vehicle, loss of vehicle stability, veering into other lanes, and other vehicle catastrophes). In embodiments, operation 306 may be executed so that optimum values may not or cannot include the values for operational parameters which did not allow for successful navigation of the vehicle. In embodiments, operation 306 may be executed so that optimum values may not or cannot include the values for operational parameters which resulted in a vehicle catastrophe and otherwise unsuccessful vehicle navigation and performance of a vehicle maneuver.

In some implementations, machine learning vehicle performance circuit 218 can utilize an input for learning, classifying, and recognizing whether one or more operational parameters are optimal. In some implementations, machine learning vehicle performance circuit 218 can learn whether the vehicle successfully performed a vehicle maneuver (or not). For example, such an input can be from another simulated vehicle system (such as simulated computer vision module 134 of FIG. 1, and simulated pathing and planning module 138 of FIG. 1), from infrastructure, and/or from a user input (e.g. from GUI or another interface that can be coupled to communications interface 252).

Method 300 can include executing operation 308 for generating training set of one or more operational parameters, which can be used in a real vehicle. As previously mentioned, one or more vehicle control problems can be solved for navigation of the vehicle in simulation or outside of simulation (i.e. on a real vehicle). A real vehicle can execute one or more algorithms or control problems having multiple variables. Parameters can be used in such algorithms as controlled parameters, reference parameters, or manipulated parameters. One such algorithms is a model predictive control algorithm. Operation 308 can include generating or updating one or more training of optimum operational parameters. One or more training set can be generated, for example, by machine learning vehicle performance circuit 218. The training set can be stored in one or more storage device 220, or provided directly to a real vehicle (e.g. by communication interface 252).

Whereas method 300 of FIG. 3 includes operation for simulating simulated vehicle with contextual information for generating/updating training set of optimum operational parameters, FIG. 4 shows method for generating/updating training set of operational parameters including by simulating vehicle navigation across range of one or more operational parameters.

FIG. 4, shows example method 400 for generating or updating training set for operational parameters based on optimum values for one or more parameters. Method 400 can include operation 402 for receiving a range of values for one or more operational parameters. A range of values for an operational parameter can include one or more values for an operational parameter. As previously discussed, at least with reference to FIG. 3, operational parameters can include one or more vehicle parameter, one or more external parameter, one or more controls parameter, or any other parameter required for operation of vehicle 100 navigation. The range of values can be estimated or predicted values. The range of values can be received from another system external to simulation system 100 (e.g. by communication interface 252, or from a component of simulation system 200 (e.g. from the operational parameter database 225). To execute operation 402, for example, in some implementations, parameter retrieval logical circuit 216 retrieves one or more values in a range of values for one or more operational parameters from operational parameter database 225. Parameter retrieval logical circuit 216 can provide such range of parameters to one or more other logical circuit, for example vehicle control circuit 212. Operational parameters can have values generated by simulation or by measurements on real vehicles. The range of values can include one or more optimum values for the parameters. The range of values can Method 400 can include operation 404 for simulating vehicle navigation across a range of one or more operational parameters. To execute operation 404, simulation system 200 can recursively simulate a navigation of a simulated vehicle, while sweeping the range of values for the one or more operational parameters. To execute operation 404, simulation system 200 can recursively run a simulation of a vehicle navigation and successively update or change a value for the one or more operational parameters. For example, a vehicle navigation can be successively simulated while sweeping the range of values received at operation 402 (i.e. for the one or more operational parameters). In some embodiments, for example, the simulation system 200 can simulate a vehicle navigation for a range of vehicle weight (one possible vehicle parameter), for a range of road surface roughness (one possible external parameter), for a range a range of operational information for a model predictive controller (such as weights or gains of the model predictive controller, one possible controls parameter). It can be understood that vehicle simulation is not limited to one operational parameter, and can include vehicle simulation while sweeping one or more operational parameters of one or more types (e.g. vehicle parameters, external parameters, etc.)

Method 400 can include executing operation 406 for determining one or more optimum value for one or more operational parameter. The optimum value(s) can be determined based on simulation at operation 406. The optimum values can be for the one or more operational parameters swept at operation 406. The optimum values can be for operational parameters other than those swept at operation 406.

Optimum values for operational parameters can include the real time values for such parameters. Determination of optimum values can be accomplished by one or more learning, classification, or recognition operations of machine learning vehicle performance circuit 216. For example, an optimum value for a vehicle weight can include an actual or predicted value (e.g. predicted in simulation) of the vehicle weight. In embodiments, generating optimum values may be useful for parameters which in practice (i.e. on a real vehicle) are not-measured or not measurable. In practice, non-measured and not measurable parameters may be difficult to determine.

In addition, optimum values can include the values for operational parameters which allow for successful navigation of the vehicle. Optimum values for the one or more parameters can correspond to the values of the parameters which were determined by the simulation circuit 200 to allow for the vehicle to at least one of: (i) most closely track the path in a path tracking maneuver, (ii) most closely keep within a corridor in a corridor keeping maneuver, (iii) most successfully (e.g. efficiently or smoothly) stabilize the vehicle in a stabilization maneuver, (iv) most successfully (e.g. efficiently or smoothly while avoiding collision) maneuver to avoid vehicle collision in the collision avoidance maneuver, or (v) otherwise navigate the vehicle while avoiding a vehicle catastrophe.

In simulation, the navigation of the vehicle may have led to one or more vehicle catastrophe (e.g. a collision, loss of control of the vehicle, loss of vehicle stability, veering into other lanes, or other vehicle catastrophes). In embodiments, operation 406 may be executed so that optimum values may not or cannot include the values for operational parameters which did not allow for successful navigation of the vehicle. In embodiments, operation 406 may be executed so that optimum values may not or cannot include the values for operational parameters which resulted in a vehicle catastrophe or otherwise unsuccessful vehicle navigation or performance of a vehicle maneuver.

Machine learning vehicle performance circuit 218 can perform operation 406. For example, machine learning vehicle performance circuit 218 can utilize an input for learning, classifying, or recognizing whether one or more operational parameters are optimal, or learning whether the vehicle successfully performed a vehicle maneuver (or not). For example, such an input can be from another simulated vehicle system (such as simulated computer vision module 134 of FIG. 1, or simulated pathing and planning module 138 of FIG. 1), from infrastructure, or from a user input (e.g.

from GUI or another interface that can be coupled to communications interface 252).

In example implementations, to implement method 400, the simulation system 200 can receive a range of values for one operational parameter at operation 402. The simulation system 200 can simulate vehicle navigation across a range for that one operational parameter at operation 404. The simulation system 200 can determine optimum values for at least one other operational parameter (e.g. other than the one operational parameter of operations 402 and 404). The simulation system 200 can generate or update training set with one or more of the determined optimum values for at least one other operational parameter (i.e. at least a subset of the determined optimum values which were determined at operation 406).

Embodiments as described herein can repeat at least one of operations 402, 404, 406, 407 so that a training set is generated or updated with at least one optimum value for a parameter. For example, at operation 404, simulation system 200 can simulate a vehicle navigation for a value of one operational parameter. At operation 406, optimum value(s) can be determined for one or more other operational parameters based on the simulation at operation 404. At step 408, a training set can be updated based on one least one of those determined optimum values (i.e. determined at operation 406). Operation 404, 406, 408 can successively be repeated for other values for the operational parameter (e.g. the value at a previous iteration of operation of operation 404, plus or minus some amount).

Implementation of method 300 can also include implementation of method 400, and vice, versa. More particularly, FIG. 4 can provide another way of looking at the process 300 described with reference to FIG. 3. For example, generation of contextual information at operation 304 and simulating vehicle navigation in context at operation 305 can include simulating vehicle navigation across range of one or more operational parameters (i.e. as previously described with respect to operation 406 of method 400). Moreover, simulating vehicle navigation across range of one or more operational parameters (i.e. as described with reference to operation 406 of method 400) can include generation or generation of contextual information and simulating vehicle navigation in at least a part of that context (e.g. as described with reference to FIG. 3 and method 300).

Vehicle Control Problems and Implementations in Vehicles

As previously mentioned, one or more vehicle control problems can be solved for navigation of the vehicle in simulation and outside of simulation (i.e. on a real vehicle).

A model based controller can track one or more vehicle states for the vehicle. The model based controller can track one or more vehicle states for the vehicle, while limiting the vehicle dynamics to a safe operating region.

FIG. 5 illustrates an example process for determining operational parameters, such as operational parameters for a vehicle control algorithm, by at least partially controlling operation of a vehicle based on operational constraints of the vehicle or contextual constraints, in accordance with one or more implementations.

The process can include one or more variations of method 500 shown. Method 500 can include one or more operations that can be performed in simulation (i.e. for a simulated vehicle, including on simulation system 200), or on a vehicle (i.e. a non-simulated vehicle). Thus, method 500 can be performed at least partially in simulation. Method 500 can be performed on a real vehicle (i.e. a non-simulated vehicle). Real vehicle can be loaded with one or more training data, including as generated by simulation system 200. The training data can include one or more training set of one or more operational parameters, including as previously discussed with reference to operations 308 of FIG. 3, and operation 308 of FIG. 4.

An operation 502 of method 500 may include generating output signals conveying operational information regarding the vehicle. For example, if the vehicle is a simulated vehicle, simulation system 200 can generate one or more output signals in simulation (e.g. at a simulated sensor 120, another simulated vehicle 100 component or module). The operational information may include values of operational parameters of the vehicle. Operation 502 may be performed by one or more hardware processors configured by machine-readable instructions including a component that is the same or similar to vehicle control circuit 212, or a component configured as one or more sensors 120, in accordance with one or more implementations.

If the vehicle is a real vehicle, the output signals can convey operational information for the real vehicle, such as a control input for the vehicle (e.g. a human or ADAS provided control input).

An operation 504 may include generating output signals conveying contextual information regarding the vehicle. The contextual information may include values of contextual parameters of the vehicle. Operation 504 may be performed by one or more hardware processors configured by machine-readable instructions including a component that is the same or similar to vehicle control circuit 212, contextual information generation circuit 215, or a component configured as one or more sensors 120, in accordance with one or more implementations.

For example, if method 500 is performed on a simulated vehicle, operation 504 can be performed at least partially by contextual information generation circuit 215. For example, contextual information generation circuit 215 can generate one or more signals which correspond to information regarding a simulated surrounding contextual environment of the vehicle, including other vehicles or obstacles. If method 500 is performed on a real vehicle, operation 504 can be performed by generating one or more signals, for example, at one or more sensors of the vehicle.

An operation 506 may include determining the operational information. Operation 508 can include determining one or more operational constraints, in accordance with one or more implementations. Operation 406 may be performed by one or more hardware processors configured by machine-readable instructions including a component that is the same as or similar to vehicle control circuit 212, or a component configured as operational information determination component of vehicle control circuit 212, in accordance with one or more implementations. Operation 506 can include determining one or more operational parameters.

Operation 506, whether executed on a simulated or real vehicle, can include determining the operational information by using the training data. Training data can include a training set generated and updated at operation 308 shown in FIG. 3 or operation 408 shown in FIG. 4. The training data can include values for one or more operational parameters. As previously discussed, operational information can include values for one or more operational parameters for the vehicle, including vehicle parameters, and vehicle controls parameters. The training data can include training data that was developed in simulation of one or more vehicles across a range of one or more operational parameters, for example as shown in method 400 of FIG. 4. In embodiments where method 500 is performed on a vehicle, the vehicle can have in memory (e.g. data storage 103 with reference to FIG. 1, or another AV control system 130), one or more training data set.

Operation 508 may include determining the contextual information. The determination of the contextual information may be based on the output signals. The determination of the contextual information may be based on the output signals generated at operation 504. Operation 508 can include determining one or more contextual constraints, in accordance with one or more implementations. Operation 508 may be performed by one or more hardware processors configured by machine-readable instructions including a component that is the same as or similar vehicle control circuit 212, and a component configured as contextual information determination component 265, in accordance with one or more implementations.

If operation 508 is performed on a real vehicle (i.e. a non-simulated vehicle), operation 508 can be performed by processing one or more generated output signals. If operation 508 is performed on a simulated vehicle, operation 508 can be performed by contextual information determination component 265.

Operation 508, whether executed on a simulated or real vehicle, can include determining the contextual information by using the training data. As previously discussed, training data can include a training set generated and/or updated at operation 308 shown in FIG. 3 and/or operation 408 shown in FIG. 4. The training data can include values for one or more operational parameters, including external parameters, and/or contextual parameters. The training data can include training data that was developed in simulation of one or more vehicles across a range of one or more operational parameters, for example as shown in method 400 of FIG. 4.

At operations 506 and 508, the control system (i.e. AV control system 130, and/or vehicle control circuit 212) receives vehicle, driver and other information from sources such as vehicle sensors (e.g., sensors 120) and vehicle systems (e.g., vehicle systems 140). Information may be received from other sources as well. For example, this can include information generated as described above with reference to operations 302 and/or 304 of FIG. 3, operation 402 and/or 403 of FIG. 4, operation 502 and/or 504 of FIG. 5.

On a real vehicle, information may be received from external sensors such as sensors at infrastructure elements sensing the vehicle as it nears or passes such elements. Vehicle information can include, for example, information from vehicle sensors indicating vehicle operating parameters such as acceleration, speed, lateral acceleration, wheel traction, vehicle roll/pitch/yaw, and so on. Vehicle information can also include information from vehicle hardware (e.g., from vehicle actuators 137 and vehicle hardware interfaces 180). This can include information regarding vehicle parameters such, for example, as steering angle inputs, throttle inputs, brake inputs, current vehicle gear, and so on. This information can be used to determine, for example, how hard a vehicle is being driven or how much it is being pushed to its limits.

The system can receive information about the road on which the vehicle is traveling. For example, map and route information such as from a GPS or other vehicle positioning system (e.g., GPS/vehicle positioning system 117) can provide information such as the route on which the vehicle is traveling and whether the vehicle is about to encounter any curves, and if so, how sharp those curves may be. Vehicle sensors or external data can be used to determine road conditions such as, for example, terrain (e.g., rough, smooth, rocky, etc.), road surface type (e.g., paper, gravel, dirt, etc.).

Environmental sensors or external data can be used to determine weather conditions for the current vehicle location. This information can be used to determine envelope conditions the vehicle is encountering or is about to encounter in a given time step of interest. For example, a subject vehicle will have certain limits negotiating a curve of a given radius on a paved roadway. In other words, there is a maximum speed beyond which the vehicle will not be able to safely negotiate the corner given expected vehicle performance specifications. That maximum safe speed is typically decreased for lower-friction road conditions such as gravel or dirt roads, wet roads, icy roads, or other environmental factors. Similarly, the tighter the radius of the corner, the lower the maximum safe speed. Accordingly, this may increase the level of risk predicted by the system.

The system can receive information about the driver. Sensors can monitor the state of the driver to determine whether the driver is performing at or near the maximum of their capability level. Head and eye movement sensors, vehicle motion sensors, and other sensors can determine whether a driver is fatigued or stressed, not paying attention, or otherwise not performing at their normal level of competency. Where the system determines that a driver is not performing optimally, this may also increase the level of risk predicted by the system.

An operation 510 may include determining a current vehicle state of the vehicle. The determination of the current vehicle state may be based on the operational information and contextual information. The current vehicle state may represent current values of one or more of the operational parameters of the vehicle. The current vehicle state may represent current values of the vehicle parameters, external parameters, controls parameters, and contextual parameters of the vehicle. Operation 510 may be performed by one or more hardware processors configured by machine-readable instructions including a component that is the same as or similar to vehicle control circuit 212, vehicle state determination component 270, and/or model predictive control circuit 214 in accordance with one or more implementations.

Determining the current vehicle state of the vehicle can include determining the current vehicle state in view of determined operational and contextual information. This can include determining how closely the vehicle tracks an expected path. This can also include how the vehicle acts or reacts in view of contextual or other operational information, such as how the vehicle avoids a collision.

An operation 512 may include determining a future vehicle state of the vehicle. The determination of the future vehicle state may be based on the current vehicle state. The determination of the future vehicle state may be based on the determined operational information. Operation 512 may be performed by one or more hardware processors configured by machine-readable instructions including a component that is the same as or similar to vehicle control circuit 212, and a component configured as future vehicle state prediction component 275, in accordance with one or more implementations.

For example, determining the future vehicle state of the vehicle can include determining a future vehicle state that will allow to vehicle to more closely track an expected path, and allow the vehicle to react in view of operational information, such as to avoid a collision.

An operation 514 may include determining predicted boundaries of the operational information. Such predicted boundaries can correspond to operational constraints of the vehicle. A breach of the predicted boundaries may indicate undesirable values of the operational parameters of the vehicle such that the values are nearing the operational constraints of the vehicle. Operation 514 may be performed by one or more hardware processors configured by machine-readable instructions including a component that is the same as or similar to vehicle control circuit 212, another logical circuit as described herein, and/or a component configured as boundary determination component 280, in accordance with one or more implementations.

An operation 516 may include determining predicted threshold values of a trajectory metric. Determination may be based on the contextual information and the operational information. Operation 516 may be performed by one or more hardware processors configured by machine-readable instructions including a component that is the same as or similar to vehicle control circuit 212, and/or a component configured as trajectory threshold determination component 285, and/or pathing and/or planning module 138, in accordance with one or more implementations.

An operation 518 may include controlling the vehicle such that the vehicle may circumvent vehicle catastrophes. Operation 518 may include controlling the vehicle such that the vehicle may successfully perform one or more vehicle maneuver and/or vehicle navigation. Controlling the vehicle may be based on the future vehicle state determined, the predicted boundaries of the operational information, and the predicted trajectory threshold values. Operation 418 may be performed by one or more hardware processors configured by machine-readable instructions including a component that is the same as or similar to vehicle control circuit 212, in accordance with one or more implementations. For example, the vehicle may be controlled such that the vehicle more closely tracks an expected path, and/or the vehicle reacts to avoid a collision. The vehicle can be controlled according to a vehicle control algorithm, such as an MPC.

Operation 305 for simulating contextual vehicle navigation as previously shown in FIG. 3, and/or operation 404 of FIG. 4 can be executed as any combination of operations 506-518. Alternatively, operations 506-518, when performed in simulation, can include operation 305 of FIG. 3 and/or operation 404 of FIG. 4.

An operation 520 may include determining if the vehicle was successfully controlled and/or if the vehicle was not successfully controlled. This can allow for optimizing one or more output. Operation 520 can include determining if the vehicle was successfully controlled, for example during or at the conclusion of operation 518. Operation 520 can include determining the vehicle was successfully controlled if the vehicle closely tracked a path in a path tracking maneuver (e.g. tracked an expected or predicted path within 5%, 10%, 15%, 20%, 25%, 30%, 33%, 35%, 40%). Operation 520 can include determining the vehicle was successfully controlled if the vehicle keeps within a corridor or lane in a corridor keeping maneuver (e.g. within 5%, 10%, 15%, 20%, 25%, 30%, 33%, 35%, 40%). Operation 520 can include determining in the vehicle was successfully (e.g. efficiently and/or smoothly) stabilized in a stabilization maneuver. Operation 520 can include determining if the vehicle was successfully (e.g. efficiently and/or smoothly while avoiding collision) maneuvered to avoid vehicle collision in a collision avoidance maneuver. Thus, operation 520 can include determining that a vehicle catastrophe was avoided.

Generally, operation 520 can include determining if controlling and/or navigating the vehicle (e.g. during performance of either of operations 502-518), resulted in a successful vehicle navigation. Further, operation 520 can include determining if controlling and/or navigating the vehicle (e.g. at execution of either of operations 502-518) resulted in a vehicle catastrophe, near-vehicle catastrophe, and/or otherwise unsuccessful vehicle navigation. Further, operation 520 can include determining that one or more predicted boundaries, predicted threshold values, predicted envelope constraints, etc. were violated.

In simulation, the navigation of the vehicle may have led to one or more vehicle catastrophe (e.g. a collision, loss of control of the vehicle, loss of vehicle stability, veering into other lanes, and/or other vehicle catastrophes). Thus, operation 520 can include determining that navigation of the vehicle resulted in one or more vehicle catastrophes.

In simulation, operation 522 can be performed by machine learning vehicle performance circuit 218. For example, machine learning vehicle performance circuit 218 can utilize an input for learning, classifying, and/or recognizing whether one or more operational parameters are optimal, and/or learning whether the vehicle was successfully controlled. For example, such an input can be from another simulated vehicle system (such as simulated computer vision module 134 of FIG. 1, and/or simulated pathing and planning module 138 of FIG. 1), from infrastructure, and/or from a user input (e.g. from GUI or another interface that can be coupled to communications interface 252).

The machine learning algorithm can be trained to adjust the parameters of the vehicle to optimize the output. An operation 522 can include updating training set based on the determination of if the vehicle was successfully controlled or not. The training set can be a training set of one or more operational parameters. The training set can be the same or different training set of operational parameters as described with reference to operation 308 of method 300, and operation 408 of method 400.

As previously discussed, if method 500 is performed on a real vehicle, the vehicle can have in memory (e.g. data storage 103 with reference to FIG. 1, or another AV control system 130), one or more training data set. Operation 522 can include updating training sets for operational information and/or contextual information. Operation 522 can include specifically updating one or more training set if it was used in executing one or more operations 506-518. Operation 522 can include specifically updating one or more training set if it was used in executing one or more operations 506-518, and vehicle was determined to be successfully controlled at operation 520. Operation 522 can include specifically updating one or more training set if it was used in executing one or more operations 506-518, and vehicle was determined to be unsuccessfully controlled at operation 520.

In embodiments, operation 522 may be executed so that one or more training set are updated with optimum values. In embodiments, optimum values may not or cannot include the values for operational parameters which did not allow for successful navigation of the vehicle. Thus, at operation 522, optimum values can be updated with values which allowed for successful navigation of the vehicle as determined at operation 520.

Generally one or more operations 502-522 can be used to at least partially control operation of a vehicle based on operational constraints of the vehicle or contextual constraints, in accordance with one or more implementations.

A controller (e.g. autonomous control module, AV control system 130, computing system 110, processor 204, and/or vehicle control circuit 212) can divide the control operation (e.g., one or more of the operations 502-522) into a series of discrete time steps. As noted above, model predictive control (MPC) can be used to predict future dynamic problems forward in time over a time horizon and a solution can be implemented and calculated to avoid the predicted problem. Embodiments may be implemented in which the controller has at least two main objectives. These include a short-term objective of restricting fast dynamics related to vehicle stability and tracking driver commands, and a longer-term objective of keeping the vehicle within a safe path on the road. Accordingly, embodiments may be implemented to use a variable time discretization for the MPC horizon to account for short-term and longer-term objectives. When discretizing a continuous vehicle model, the time step is need not be constant, but may vary depending on the depth of the horizon.

For the kth step in the prediction horizon, the variable timestep may be defined as follows:

$$t_s(k) = \begin{cases} t_{short}(s), & 1 < k < T_{corr} \\ t_{corr}, & k = T_{corr} \\ t_{long}(s), & T_{corr} < k < (T) \end{cases}$$

where T is the length of the time horizon (in steps) and tcorr is a correction time step at horizon step Tcorr that aligns the physical representation of the environment in a consistent manner from cycle to cycle (i.e. so the values of s at the long time steps are preserved in subsequent horizons and static obstacles don't look like they're moving). The correction time step works correctly when speed is assumed constant, so another solution may be required to account for speed changes (in K) occurring over the time horizon. Also note that tshort and tlong should be multiples of each other for consistency in computation.

Discretization of the vehicle model may be implemented as a combination of zero-order hold for short time steps, and first-order hold for long time steps. Embodiments may be implemented such that throughout the short time steps, the input (e.g., lateral force, steer angle or other input) is held constant over the duration of the time steps. In many applications, this may be consistent with what is physically happening in low-level hardware controllers.

The control system can evaluate the received information in view of one or more vehicle performance envelopes. This can be accomplished, for example, as described above with respect to operations 506-516 of FIG. 5. The assessment can include, for example, estimating driver intent based on human control inputs, and determining one or more operational parameters (such as vehicle parameters, external parameters, or controls parameters) based on the information received (such as vehicle information, driver information, environment information, or contextual information). As a further example, given current vehicle states, actuator inputs, driver command/intent profile, speed profile, friction and so on, the system can determine whether the vehicle is being operated at or within a predetermined distance from envelope boundaries.

In various embodiments, the controller algorithm may be implemented to use MPC with envelope constraints in mind. The envelope constraints in some embodiments may be built into the control algorithm (for example, don't exceed yaw rate or steering angle). In various embodiments, these constraints can be accounted for in the controller so that there is no need to perform threat assessment after the fact. Accordingly, various embodiments may be implemented in which no threat assessment is performed after the control algorithm.

At either of operations 510-520, the system can generate an optimal solution for vehicle control to maintain operation within the determined envelope. Where the driver is controlling the vehicle within determined bounds of performance constraints, for example, the optimal solution determined by the system may be the driver input without modification. On the other hand, where the vehicle is too close to or beyond one or more performance envelopes, for each timestep in real time, the controller can solve an optimization over the time horizon to find a desired input sequence. The desired input sequence may be referred herein to as an optimal command or optimal solution, even though a wholly optimal solution might not be reached depending on current circumstances and constraints.

The solution can be applied to the subject time step. This can be accomplished, for example, as described above with respect to operation 418 of FIG. 4. In some embodiments, two approaches to applying the solution can be provided. A driver-in-loop approach and/or a full-control approach.

For driver-in-the-loop scenarios, the desired input sequence may be generated to match the driver's command where no envelope violations are predicted (e.g. as determined at operation 514). At the first step in the time horizon, this is assumed to be the case, and the sequence may be generated to match a driver's commands unless an envelope violation will occur at some point on the horizon. At each real timestep, the first desired command set of the time horizon is applied to the actuators, and then the process is repeated. If there are no envelope violations predicted, the driver-in-loop control result may match the driver's commands.

To stabilize the vehicle, embodiments may combine vehicle stability envelopes, actuator envelopes and vehicle models to define the minimization problem. Vehicle up-date equations (e.g., such as those based on a discretized lateral bicycle model), may provide an equality constraint, while the envelopes may provide bounded constraints or polytopic inequalities.

An example of the minimization problem is provided by a state vector in various embodiments. The state vector for the optimization in one example contains vehicle states sideslip and yaw rate, inputs of front lateral force and change in front lateral force, and a slack variable on the vehicle states, and is defined as:

$$\left[ \beta(k) \; r(k) \; \frac{F_{yf}(k)}{1000} \; \frac{\Delta F_{yf}(k)}{1000} \; S_{veh}(k) \right]^T$$

The slack variable may be used to ensure a feasible solution. Note that any lateral force values are converted from N to kN to ensure proper scaling of the matrices.

The minimization cost function may be provided to minimize over k=1 as:

$$\begin{bmatrix} \beta(1) \\ r(1) \\ \frac{F_{yf}(1)}{1000} \\ \frac{\Delta F_{yf}(1)}{1000} \\ S_{veh}(1) \end{bmatrix}^T \begin{bmatrix} Q_\beta & & & & \\ & Q_r & & & \\ & & R_{F_{yf}} & & \\ & & & R_{\Delta F_{yf}} & \\ & & & & 0 \end{bmatrix} \begin{bmatrix} \beta(1) \\ r(1) \\ \frac{F_{yf}(1)}{1000} \\ \frac{\Delta F_{yf}(1)}{1000} \\ S_{veh}(1) \end{bmatrix}$$

$$\ldots + \begin{bmatrix} 0 & 0 & -1 & 0 & \Sigma W_{veh} \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} + \frac{F_{y,f,driver}}{1000}$$

and over $k = 2{:}T$:

$$\begin{bmatrix} \beta(k) \\ r(k) \\ \frac{F_{yf}(k)}{1000} \\ \frac{\Delta F_{yf}(k)}{1000} \\ S_{veh}(k) \end{bmatrix}^T \begin{bmatrix} Q_\beta & & & & \\ & Q_r & & & \\ & & R_{Fyf} & & \\ & & & R_{\Delta Fyf} & \\ & & & & 0 \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix}$$

$$\ldots + \begin{bmatrix} 0 & 0 & -1 & 0 & \Sigma W_{veh} \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} + \frac{F_{y,f,driver,pred}}{1000}$$

where Q denotes a cost on the state or input, R donates a cost on the input, and W denotes a cost on the slack variable. The first timestep in the horizon (k=1) requires minimization of the difference in the driver's command lateral force Fyf,driver (through steering angle) and the optimal lateral force Fyf(1), whereas subsequent steps in the horizon compare to the predicted driver's command Fyf,driver,pred.

The actuator envelopes can be given by the bounded constraints:

$$\begin{bmatrix} \frac{Fyf,\min}{1000} \\ \frac{\Delta Fyf,\min}{1000} \\ 0 \end{bmatrix} \leq \begin{bmatrix} \frac{Fyf(k)}{1000} \\ \frac{\Delta Fyf(k)}{1000} \\ S_{vech}(k) \end{bmatrix}, k = 1{:}T$$

$$\begin{bmatrix} \frac{Fyf(k)}{1000} \\ \frac{\Delta Fyf(k)}{1000} \end{bmatrix} \leq \begin{bmatrix} \frac{Fyf,\max}{1000} \\ \frac{\Delta Fyf,\max}{1000} \end{bmatrix}, k = 1{:}T$$

These constraints also maintain that the slack variable is greater than zero. The minimum and maximum lateral forces can be determined by the sliding force (e.g., from a lateral brush tire model) after derating, and the maximum slew rate is determined by the steering motor and the cornering stiffness.

The stability envelope (example described below) may be converted to a polytopic inequality as follows:

$$\begin{bmatrix} 1 & -\frac{b}{V_x} & 0 & 0 & -1 \\ -b_3 & 1 & 0 & 0 & -1 \\ -1 & \frac{b}{V_x} & 0 & 0 & -1 \\ b_3 & -1 & 0 & 0 & -1 \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} \leq \begin{bmatrix} b_1 \\ b_4 \\ b_1 \\ b_4 \end{bmatrix}, k = 1{:}T$$

The 4×5 matrix is the vehicle envelope and the far right column of the 4×5 matrix denotes the slack on the vehicle envelope. The sideslip limits are provided by b1 and the yaw rate limits are provided by b4. Each line of the matrix corresponds to the max/min yaw rate or sideslip boundaries. The vehicle slack variable is taken into account here so that each boundary equation is given by:

$$H_{veh}(k)x(k) \leq G_{veh}(k) + S_{veh}(k)$$

The vehicle dynamics may be constrained by the following inequality:

$$\begin{bmatrix} -1 & 0 & 0 & 0 & 0 \\ 0 & -1 & 0 & 0 & 0 \\ 0 & 0 & -1 & 1 & 0 \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} + \begin{bmatrix} A_{disc} & B_{1,disc} & 0 \\ 0 & 1 & 0 \end{bmatrix} \begin{bmatrix} \beta(k-1) \\ r(k-1) \\ \frac{F_{yf}(k-1)}{1000} \\ \frac{\Delta F_{yf}(k-1)}{1000} \\ S_{veh}(k-1) \end{bmatrix}$$

$$\ldots = -\begin{bmatrix} B_{3,disc} \\ 0 \end{bmatrix}, k = 2{:}T$$

$$\begin{bmatrix} 1 & 0 & 0 & 0 & 0 \\ 0 & 1 & 0 & 0 & 0 \\ 0 & 0 & 1 & -1 & 0 \end{bmatrix} \begin{bmatrix} \beta(1) \\ r(1) \\ \frac{F_{yf}(1)}{1000} \\ \frac{\Delta F_{yf}(1)}{1000} \\ S_{veh}(1) \end{bmatrix} = \begin{bmatrix} \beta_{mease} \\ r_{meas} \\ \frac{F_{yf,comm}}{1000} \end{bmatrix}, k = 1$$

These equations also require that Fyf (k+1)–Fyf (k)=ΔFyf (k+1). For the initial timestep in the horizon k=1, the states are constrained to be equal to the measured states from the vehicle (βmeas,γmeas) and the most recent input (Fyf, comm). In embodiments in which the system is configured to optimize only over the lateral dynamics, Vx is assumed to be known at each step of the horizon as the dynamic matrices are calculated. In various embodiments, this information may come from the trajectory optimizer (e.g. at path and planning module 138).

As described herein, vehicles can be flying, submersible, boats, roadway, off-road, passenger, truck, trolley, train, drones, motorcycle, bicycle, or other vehicles. As used herein, vehicles can be any form of powered or unpowered transport. Obstacles can including one or more pedestrian, vehicle, animal, and/or other stationary or moving objects. Contextual information and/or environmental information as described herein can be configured for the various environments and/or navigation scenarios for these vehicles.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, or C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof. While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order, and/or with each of the steps shown, unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method for determining optimal operational parameters for a model predictive controller for controlling a vehicle, the method comprising:
   receiving, at a hardware processor, from a data store or a graphical user interface, a range of values for one or more operational parameters, the one or more operational parameters comprising one or more external parameters; and
   determining, by a trained machine learning vehicle performance circuit, optimum values for the one or more operational parameters amongst the range of values of the one or more operational parameters, wherein the trained machine learning vehicle performance circuit is trained by:
      simulating, by a vehicle control circuit, a vehicle operation across the range of values of the one or more operational parameters by solving a vehicle control problem;
      determining, by the machine learning vehicle performance circuit, an output of the vehicle control problem, the output based on a result for the simulated vehicle operation; and
      updating the trained machine learning vehicle performance circuit based on the output.

2. The method of claim 1, wherein the one or more external parameters are selected from a group consisting of:
   a friction coefficient between at least one tire and a road,
   a gravitational constant,
   a road surface roughness,
   an external humidity,
   a wind vector, and
   an external temperature.

3. The method of claim 1, wherein the one or more operational parameters further comprise at least one or more vehicle parameter.

4. The method of claim 3, wherein the one or more vehicle parameter is selected from a group consisting of a distance a from a center of gravity (CG) to a front axle of the vehicle, a distance b from the center of gravity (CG) to a rear axle of the vehicle, a distance L from the center of the front axle to the center of the rear axle of the vehicle, a tire distance from the CG to the rear axle of the vehicle, a vehicle speed $V_x$, a vehicle yaw rate r, vehicle sideslip angle β, front steering angle δ, front and rear lateral tire forces $F_{yf}$ and $F_{yr}$, a vehicle mass m, a yaw inertia $I_{zz}$, a height h of the vehicle's CG, a wheel radius R, a cornering stiffness C, a front axle cornering stiffness $C_{af}$, or a rear axle cornering stiffness $C_{ar}$.

5. The method of claim 1, wherein the determined optimum values of the one or more operational parameters are for parameters which are not directly measurable by a vehicle outside of simulation, and wherein the vehicle operation is simulated across a range of one or more parameters which are parameters which are directly measurable by a vehicle.

6. The method of claim 1, wherein the vehicle operation comprises at least one of a path tracking, corridor keeping, stabilization, or collision avoidance maneuver, and optimum values for the one or more operational parameters correspond to the values of the parameters which were determined by the trained machine learning vehicle performance circuit to allow for the vehicle to at least one of:
   (i) track the path in the path tracking maneuver,
   (ii) remain within the corridor in the corridor keeping maneuver,
   (iii) stabilize the vehicle in the stabilization maneuver, or
   (iv) maneuver to avoid vehicle collision in the collision avoidance maneuver.

7. The method of claim 1, further comprising:
   generating a training set of optimum one or more operational parameters, wherein the training set of optimum one or more operational parameters is configured to be used as an initial parameter set for a model predictive controller operating on a vehicle.

8. The method of claim 7, wherein the vehicle operation comprises at least one of a path tracking, corridor keeping, stabilization, or collision avoidance maneuver, and wherein the trained machine learning vehicle performance circuit is trained by:
   simulating, by the vehicle control circuit, the vehicle operation across a full range of the one or more operational parameters by solving a model predictive control problem for at least one of the path tracking, corridor keeping, stabilization, or collision avoidance maneuver; and
   determining the optimum value for one of the parameter based on outcome of the path tracking, corridor keeping, stabilization, or collision avoidance maneuver during simulation.

9. The method of claim 1, wherein the one or more operational parameters comprises a first external parameter and one or more other parameters; and determining by a trained machine learning vehicle performance circuit, optimum values for the one or more operational parameters further comprises:
   determining by the trained machine learning vehicle performance circuit, a value for the first external parameter based on the one or more other parameters.

10. The method of claim 1, wherein the one or more operational parameters further comprise at least one controls parameter.

11. The method of claim 10, wherein the vehicle control problem comprises the model predictive controller, and wherein the one or more controls parameters comprise one or more of a gain Q on a vehicle state, a gain R on an input to the model predictive controller, or a gain W on a slack to the vehicle state.

12. The method of claim 11, wherein the operational parameters further comprise a vehicle parameter, and the gain Q on the vehicle state, the gain R on the input, or the gain W on the slack, are gains based on the one or more vehicle parameters.

13. The method of claim 11, wherein the vehicle operation comprises at least one of a path tracking, corridor keeping, stabilization, or collision avoidance maneuver, and optimum values for the one or more operational parameters correspond to the values of the controls parameters which were determined by the trained machine learning vehicle performance circuit to allow for the vehicle to at least one of:
   (i) track the path in the path tracking maneuver,
   (ii) remain within the corridor in the corridor keeping maneuver,
   (iii) stabilize the vehicle in a stabilization maneuver, or
   (iv) maneuver the vehicle to avoid vehicle collision in the collision avoidance maneuver.

14. The method of claim 1, wherein the vehicle control problem comprises a model predictive control problem which controls a control input for an actuator of the vehicle based on:
   a current vehicle state;
   predicted boundaries for values of the one or more operational parameters; and
   a future vehicle state determined based on the predicted boundaries for values of the one or more operational parameters.

15. The method of claim 1, further comprising:
   determining, by the trained machine learning vehicle performance circuit, an optimum value for an external parameter of the one or more external parameters amongst a range of values of the external parameter; and
   simulating, by the vehicle control circuit, the vehicle operation across the range of values of the one or more external parameters by solving a vehicle control problem.

16. A vehicle, comprising:
   a processing component configured to adjust a control input for an actuator of the vehicle according to a control algorithm; and
   a data store coupled to the processing component, wherein the data store contains a value for an external parameter for execution of the control algorithm;
   wherein the processing component is configured to adjust the control input based on the value for the external parameter;
   wherein the value for the external parameter was received by the processing component by a vehicle simulation system; and
   wherein the vehicle simulation system generated the value for the external parameter by simulating a vehicle operation across a range of values of one or more operational parameters; and determined an optimum value for the external parameter amongst a range of values of the external parameter based on a result for the simulation of the vehicle operation.

17. The vehicle of claim 16, wherein the vehicle simulation system simulated a vehicle operation across the range of values of the one or more operational parameters by:
   solving a vehicle control problem which solves for how the vehicle performs in simulation of a vehicle maneuver across the range of values of the one or more operational parameters;
   determining a solution for the vehicle control problem, the solution based on the vehicle's performance in simulation of the vehicle maneuver; and
   determining the optimum value based on the solution.

18. The vehicle of claim 17, wherein the vehicle control problem is a model predictive control problem, and the control algorithm comprises the model predictive control problem; and
   wherein the value for the external parameter was determined by simulating a vehicle maneuver across a range of values for one or more other external parameters.

19. The vehicle of claim 17, wherein the processing component is configured to adjust the control input so that the vehicle performs a vehicle maneuver, and wherein the value for the external parameter is updated based on an outcome of the performance of the vehicle maneuver.

20. The vehicle of claim 16, wherein the one or more operational parameters comprise a vehicle parameter or a controls parameter; and wherein the control algorithm comprises a model predictive control problem which controls the control input based on:
   a current vehicle state;
   predicted boundaries for values of the one or more operational parameters; and
   a future vehicle state determined based on the predicted boundaries for the range of values of the one or more operational parameters.

21. The vehicle of claim 20, wherein the vehicle parameter comprises a distance a from the center of gravity (CG) to a front axle of the vehicle, a distance b from a center of gravity (CG) to a rear axle of the vehicle, a distance L from the center of the front axle to the center of the rear axle of the vehicle, a tire distance from the CG to the rear axle of the vehicle, a vehicle speed $V_x$, a vehicle yaw rate r, vehicle sideslip angle $\beta$, front steering angle $\delta$, front and rear lateral tire forces $F_{yf}$ and $F_{yr}$, a vehicle mass m, a yaw inertia $I_{zz}$, a height h of the vehicle's CG, a wheel radius R, a cornering stiffness C, a front axle cornering stiffness $C_{af}$, or a rear axle cornering stiffness $C_{ar}$; and
   the external parameter comprises a friction coefficient between at least one tire of the vehicle and a road, a gravitational constant, a road surface roughness, an external humidity, a wind vector, or external temperature; and
   the controls parameter comprises a gain Q on the vehicle state, a gain R on an input to the model predictive controller, or a gain W on a slack to the vehicle state.

* * * * *